United States Patent
Pullen et al.

(10) Patent No.: US 10,326,296 B2
(45) Date of Patent: Jun. 18, 2019

(54) DUAL-PHASE OPERATION FOR CONCURRENTLY CHARGING A BATTERY AND POWERING A PERIPHERAL DEVICE

(71) Applicant: QUALCOMM Incorporated, San Diego, CA (US)

(72) Inventors: Stuart Pullen, Raleigh, NC (US); Steve Hawley, Emerald Hills, CA (US); Thomas O'Brien, Powell, OH (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 15/273,517

(22) Filed: Sep. 22, 2016

(65) Prior Publication Data

US 2017/0222464 A1   Aug. 3, 2017

Related U.S. Application Data

(60) Provisional application No. 62/289,899, filed on Feb. 1, 2016, provisional application No. 62/289,873, filed on Feb. 1, 2016.

(51) Int. Cl.
*H02J 7/00* (2006.01)
*G06F 1/26* (2006.01)
(Continued)

(52) U.S. Cl.
CPC .............. *H02J 7/0072* (2013.01); *G06F 1/26* (2013.01); *G06F 1/266* (2013.01); *H02J 7/0052* (2013.01);
(Continued)

(58) Field of Classification Search
CPC ...... H02J 7/0072; H02J 7/0052; H02J 7/0063; H02J 2007/0067; H02J 1/10; H02J 7/0068;
(Continued)

(56) References Cited

U.S. PATENT DOCUMENTS 5,541,490 A   7/1996 Sengupta et al.
6,229,289 B1   5/2001 Piovaccari et al.
(Continued)

FOREIGN PATENT DOCUMENTS

WO   2010138948 A2   12/2010
WO   2012075301 A2   6/2012
(Continued)

OTHER PUBLICATIONS

International Search Report and Written Opinion—PCT/US2017/014178—ISA/EPO—dated May 10, 2017.
(Continued)

*Primary Examiner* — Robert L Deberadinis
(74) *Attorney, Agent, or Firm* — Seyfarth Shaw LLP

(57) ABSTRACT

A multi-phase (e.g., dual-phase) concurrent configuration of a power management component supports higher current levels to peripheral devices while maintaining acceptable thermal limits. A dual-phase integrated circuit (IC) having a first input/output (I/O) port coupled to a battery and a second I/O port coupled to an adapter and a peripheral device implements the configuration. The dual phase IC includes a dual-phase voltage regulator that selectively provide power (i) from the first I/O port to the second I/O port to provide power to the peripheral device or (ii) from the second I/O port to the first I/O port to provide power to the battery. A controller activates a boost phase to power the second I/O port in response to detecting a demand current of the peripheral device exceeds a maximum current available from the adapter.

22 Claims, 16 Drawing Sheets

(51) Int. Cl.
*H02M 3/158* (2006.01)
*H02J 1/10* (2006.01)
*H02J 7/02* (2016.01)

(52) U.S. Cl.
CPC .......... *H02J 7/0063* (2013.01); *H02J 7/0068* (2013.01); *G06F 1/263* (2013.01); *H02J 1/10* (2013.01); *H02J 7/025* (2013.01); *H02J 2007/0059* (2013.01); *H02J 2007/0062* (2013.01); *H02J 2007/0067* (2013.01); *H02M 3/1584* (2013.01)

(58) Field of Classification Search
CPC ................ H02J 7/025; H02J 2007/059; H02J 2007/0062; G06F 1/263; G06F 1/266; H02M 3/1584
See application file for complete search history.

(56) References Cited

U.S. PATENT DOCUMENTS

| | | |
|---|---|---|
| 6,748,788 B2 | 6/2004 | Yamano et al. |
| 6,894,461 B1 | 5/2005 | Hack et al. |
| 8,260,370 B2 | 9/2012 | Shaffer et al. |
| 8,766,600 B2 | 7/2014 | Hussain et al. |
| 9,197,129 B2 | 11/2015 | Mehta et al. |
| 9,219,369 B2 | 12/2015 | Mehta et al. |
| 2002/0071301 A1 | 6/2002 | Kinghorn |
| 2011/0006743 A1 | 1/2011 | Fabbro et al. |
| 2011/0074356 A1 | 3/2011 | Yamazaki et al. |
| 2011/0133700 A1 | 6/2011 | Martin et al. |
| 2011/0227525 A1 | 9/2011 | Blackall et al. |
| 2012/0139501 A1 | 6/2012 | Cintra et al. |
| 2012/0268063 A1 | 10/2012 | Qiu et al. |
| 2013/0221905 A1 | 8/2013 | Holloway et al. |
| 2013/0249469 A1 | 9/2013 | Pahlevaninezhad et al. |
| 2015/0028803 A1 | 1/2015 | Shevde et al. |
| 2015/0069953 A1 | 3/2015 | Seong et al. |
| 2015/0130417 A1 | 5/2015 | Song et al. |
| 2015/0171644 A1 | 6/2015 | Paryani et al. |
| 2015/0180262 A1 | 6/2015 | Li et al. |
| 2015/0214835 A1 | 7/2015 | Shao |
| 2017/0040895 A1 | 2/2017 | May et al. |
| 2017/0085098 A1 | 3/2017 | Sporck et al. |
| 2017/0222463 A1 | 8/2017 | Pullen et al. |
| 2017/0279285 A1 | 9/2017 | Chen et al. |
| 2018/0013295 A1 | 1/2018 | Sporck et al. |

FOREIGN PATENT DOCUMENTS

| | | |
|---|---|---|
| WO | 2014150283 A2 | 9/2014 |
| WO | 2014189629 A1 | 11/2014 |
| WO | 2015077236 A1 | 5/2015 |

OTHER PUBLICATIONS

Texas Instruments., et al., "bq2419x 12C Controlled 4.5-A Single Cell USB/Adapter Charger with Narrow VDC Power Path Management and USB OTG", Jan. 1, 2012 (Jan. 1, 2012), XP055367944, Retrieved from the Internet: URL: http://www.ti.com/lit/ds/symlink/bq24192.pdf [retrieved on Apr. 26, 2017].

Aleksandar R.P., "Buck Converter with Merged Active Charge-Controlled Capacitive Attenuation", IEEE Transactions on Power Electronics, vol. 27, No. 3, Mar. 2012, pp. 1049-1054.

Lee W., et al., "Power Conversion Efficiency Characterization and Optimization for Smartphones" Proceedings of the 2012 ACM/IEEE International Symposium on Low Power Electronics and Design, Aug. 1, 2012, pp. 103-108.

DUAL-PHASE OPERATION FOR CONCURRENTLY CHARGING A BATTERY AND POWERING A PERIPHERAL DEVICE

CROSS-REFERENCE TO RELATED APPLICATION

The present application claims the benefit of U.S. Provisional Patent Application No. 62/289,899, filed on Feb. 1, 2016, and titled "DUAL-PHASE OPERATION FOR CONCURRENTLY CHARGING A BATTERY AND POWERING A PERIPHERAL DEVICE," and U.S. Provisional Patent Application No. 62/289,873, filed on Feb. 1, 2016, and titled "MULTIPHASE SWITCH MODE REGULATORS FOR CONCURRENTLY CHARGING A BATTERY AND POWERING A PERIPHERAL DEVICE," the disclosures of which are expressly incorporated by reference herein in their entireties.

TECHNICAL FIELD

The present disclosure generally relates to integrated circuits (ICs). More specifically, the present disclosure relates to a multiphase switch mode regulator for concurrently charging a battery and powering a peripheral device.

BACKGROUND

Many modern electronic systems rely on one or more batteries for power. The batteries are recharged, for example, by connecting the system to a power source (e.g., an alternating current (AC) power outlet) via a power adapter and cable. As these modern electronic systems, including mobile computing devices (e.g., smart phones, computer tablets, and the like), continue to be used more widely, the need for fast charging of batteries becomes more significant. Advancements in fast battery charging techniques are being hampered by the delay during fast charge sequences. In most cases, the delay is caused when a switch mode regulator switches between different modes of operation.

SUMMARY

In an aspect of the present disclosure, a battery charging circuit is presented. The battery charging circuit includes a dual-phase integrated circuit having a first input/output (I/O) port coupled to a battery and a second I/O port coupled to an adapter and a peripheral device. The dual-phase integrated circuit includes a dual-phase voltage regulator to selectively provide power (i) from the first I/O port to the second I/O port to provide power to the peripheral device or (ii) from the second I/O port to the first I/O port to provide power to the battery. The dual-phase integrated circuit also includes a controller operable to activate a boost phase to power the second I/O port in response to detecting a demand current of the peripheral device exceeding a maximum current available from the adapter.

In another aspect of the present disclosure, a method of operating a multiphase switch mode regulator is presented. The method includes selectively providing power (i) from a battery coupled to a first input/output (I/O) port to a peripheral device coupled to a second I/O port or (ii) from an adapter coupled to the second I/O port to the battery coupled to the first I/O port. The method also includes activating a boost phase to power the second I/O port in response to detecting a demand current of the peripheral device exceeding a maximum current available from the adapter.

In yet another aspect of the present disclosure, a battery charging circuit is presented. The battery charging circuit includes a dual-phase integrated circuit having a first input/output (I/O) port coupled to a battery and a second I/O port coupled to an adapter and a peripheral device. The dual-phase integrated circuit includes a dual-phase voltage regulator to selectively provide power (i) from the first I/O port to the second I/O port to provide power to the peripheral device or (ii) from the second I/O port to the first I/O port to provide power to the battery. The dual-phase integrated circuit also includes means for activating a boost phase to power the second I/O port in response to detecting a demand current of the peripheral device exceeding a maximum current available from the adapter.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

Mobile devices specify higher capacity batteries (amp-hour) and batteries allowing higher charge rates (C rate). For example, switch-mode battery charging integrated circuit (IC) components address the high power specifications and prevent skin hot spots. A dual-phase architecture of the switch-mode battery charging integrated circuit (IC) component achieves high power levels, improved thermal profile and minimum inductor height by spreading power across multiple phases. This power spreading allows a high peak current and supports low profile inductors. In addition, the improved thermal profile is achieved by distributing heat across a larger surface board.

The dual-phase charger architecture enables unique modes of operation that are beneficial for portable devices including, but not limited to: (1) battery charging using a 5V wireless charger in combination with an on-the-go (OTG) mode; (2) charging with a high voltage dedicated charging port (HVDCP—type C) in combination with a power cable; and (3) charging with HVDCP in combination with flash/torch functionality.

Aspects of the present disclosure provide a dual-phase, single power management component that provides key functionality without additional ICs and/or external components for concurrent battery charge and OTP mode, or other like operations. The noted dual-phase, single power management component simplifies the dual-phase operation to support concurrent battery charging and component powering. The noted dual-phase, single power management component also enables concurrent mode operation by partitioning existing circuitry on an IC rather than relying on additional circuitry.

Figure 1A:
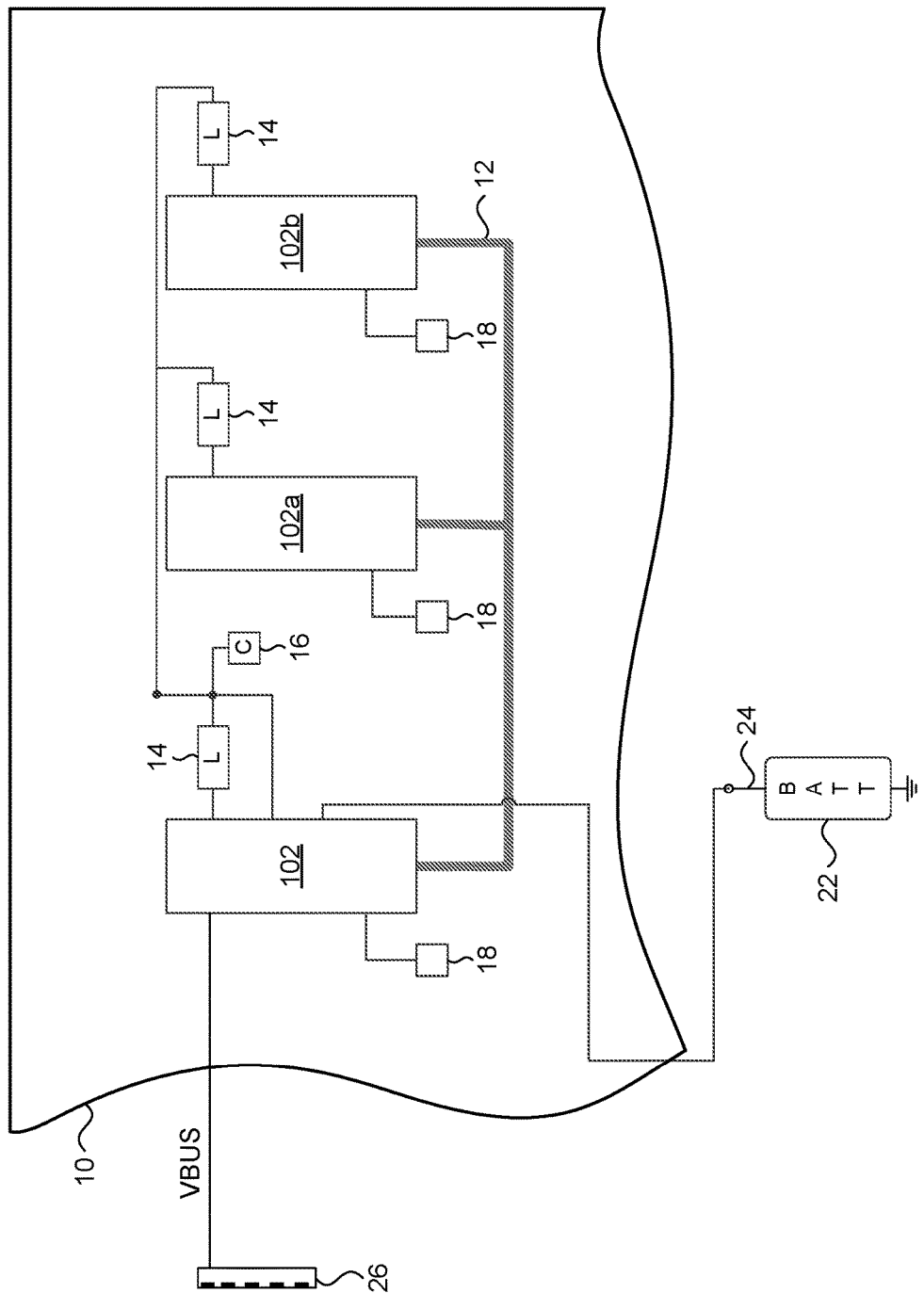
FIGS. 1A to 1C are schematic diagrams of printed circuit board (PCB) level arrangements according to aspects of the present disclosure.

FIG. 1A shows a portion of a printed circuit board (PCB) 10 populated with battery charging devices in accordance with the present disclosure. The PCB 10 may be a circuit board, for example, in a mobile computing device, a smart phone, and in general any electronic device. The PCB 10 may be populated with battery charging devices 102, 102a, 102b. It will be appreciated in the discussions to follow that fewer or more battery charging devices may be provided. Each of the battery charging devices 102, 102a, 102b may be embodied in any suitable integrated circuit (IC) packaging format (e.g., single in-line packaging, dual in-line packaging, surface mount devices, and so on) and interconnected on the PCB 10.

The voltage regulator module is a device configured to maintain a constant voltage level. The inductance 14 may include combined inductance of the voltage regulator module (or a surface mount technology inductance, or inductance caused by surface mount technology) in addition to parasitic inductance from the printed circuit board (shown in FIG. 2). The first capacitance 16 may include the combined capacitance from the voltage regulator module and any decoupling capacitance from any nearby components. The inductance 120 may include any trace inductance from the overall device near the second stage 114.

In some aspects, the battery charging devices 102, 102a, 102b are identical devices that can be configured for different modes of operation. For example, device 102 may be configured for "master" mode operation, while devices 102a, 102b may be configured for "slave" mode operation. It will be understood that battery charging devices 102, 102a, 102b may include pins or terminals (not shown) that allow the devices to be interconnected on the PCB 10 using PCB traces, represented generally by 12.

The output device 142 may be any device that would receive power, or that would benefit from a power delivery network, such as the two-stage power delivery network 100. For example, in one implementation, the output device 142 may be a modem, an application processor or any such similar device. In one implementation, the output device 142 is implemented as a die.

In accordance with principles of the present disclosure, the battery charging devices 102, 102a, 102b may be connected to a battery 22 via a connection 24 (e.g., battery terminal) for coordinated charging of the battery by the battery charging devices. The battery 22 may comprise any known configuration of one or more cells (e.g., a single-cell configuration, a multi-cell, multi-stack configuration, etc.) and may use any suitable chemistry that allows for recharging.

In some aspects, the battery charging devices 102, 102a, 102b operate as buck converters, and in other aspects the battery charging devices may comprise buck-boost converters. In some aspects, the inductive component of the buck converter may be provided as external inductive elements 14 provided on the PCB 10. Accordingly, each battery charging device 102, 102a, 102b may be connected to a corresponding external inductive element 14, such as an inductor. The inductive elements 14 are "external" in the sense that they are not part of the charging ICs that comprise the battery charging devices 102, 102a, 102b. In accordance with the present disclosure, the capacitive component of the buck converters may be provided as an external capacitive element 16 on the PCB 10 that can be shared by each battery charging device 102, 102a, 102b. The capacitive element 16 is "external" in the sense that it is not part of the charging ICs that comprise the battery charging devices 102, 102a, 102b.

Further in accordance with the present disclosure, each battery charging device 102, 102a, 102b may be connected to a corresponding external selection indicator 18 to configure the device for master or slave mode operation. Each selection indicator 18 is "external" in the sense that it is not part of the charging IC that comprises the device. In some aspects, the selection indicator 18 may be a resistive element. For example, a connection to ground potential (e.g., approximately 0Ω) may serve to indicate the device (e.g., 102) should operate in master mode. A non-zero resistance value (e.g., 10 KΩ, 100 KΩ, etc.) may serve to indicate that the device (e.g., 102a, 102b) should operate in slave mode. More generally, in other aspects, the selection indicator 18 may be a source of a suitable analog signal or digital signal that can serve to indicate to the device 102, 102a, 102b whether to operate in master mode or slave mode.

Further in accordance with the present disclosure, each battery charging device 102, 102a, 102b may be connected to a corresponding external selection indicator 18 to configure the device for master or slave mode operation. Each selection indicator 18 is "external" in the sense that it is not part of the charging IC that comprises the device. In some aspects, the selection indicator 18 may be a resistive element. For example, a connection to ground potential (e.g., approximately 0Ω) may serve to indicate the device (e.g., 102) should operate in master mode. A non-zero resistance value (e.g., 10 KΩ, 100 KΩ, etc.) may serve to indicate that the device (e.g., 102a, 102b) should operate in slave mode. More generally, in other aspects, the selection indicator 18 may be a source of a suitable analog signal or digital signal that can serve to indicate to the device 102, 102a, 102b whether to operate in master mode or slave mode.

Power to the battery charging devices 102, 102a, 102b may be externally provided via any suitable connector 26. Merely as an example, the connector 26 may be a USB connector. Power from the VBUS line of a USB connector may be connected to the device 102 (e.g., at a USBIN terminal), which may then distribute the power to the other devices 102a, 102b via a MIDUSBIN terminal. These and other terminals will be described in more detail below.

Figure 1B:
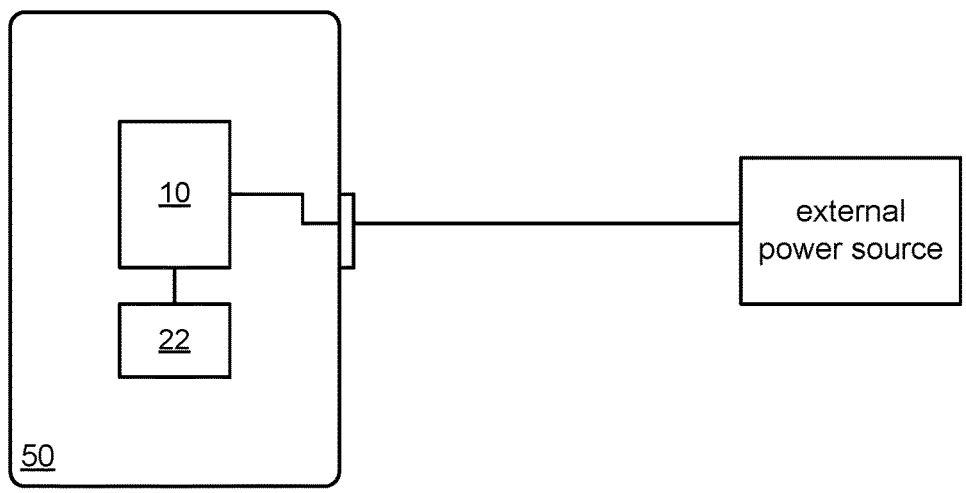
Figure 1C:
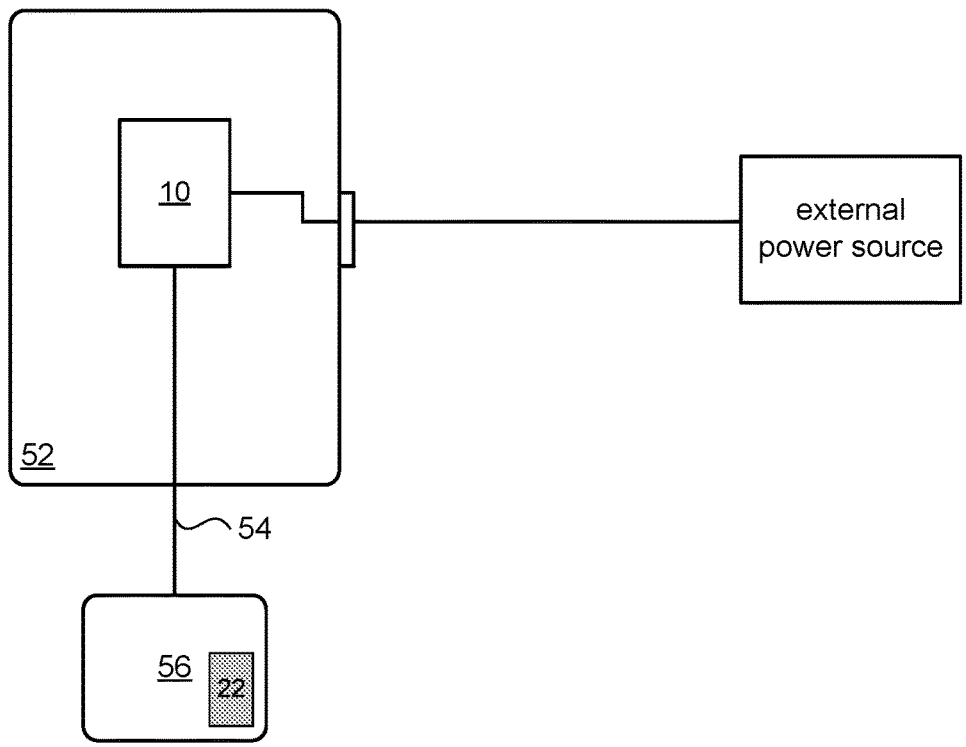

One of ordinary skill will appreciate that aspects of the present disclosure may include any electronic device. For example, FIG. 1B points out that the PCB 10 may be incorporated in any electronic device 50 to charge the battery 22. FIG. 1C illustrates another configuration in which the PCB 10 may be provided in a first electronic device 52 that has a connection 54 to a second electronic device 56 to charge the battery 22 in the second electronic device. In some aspects, the connection 54 may not be physical, for example, wireless energy transfer from the first electronic device 52 may be provided using magnetic induction circuitry (not shown).

Figure 2:
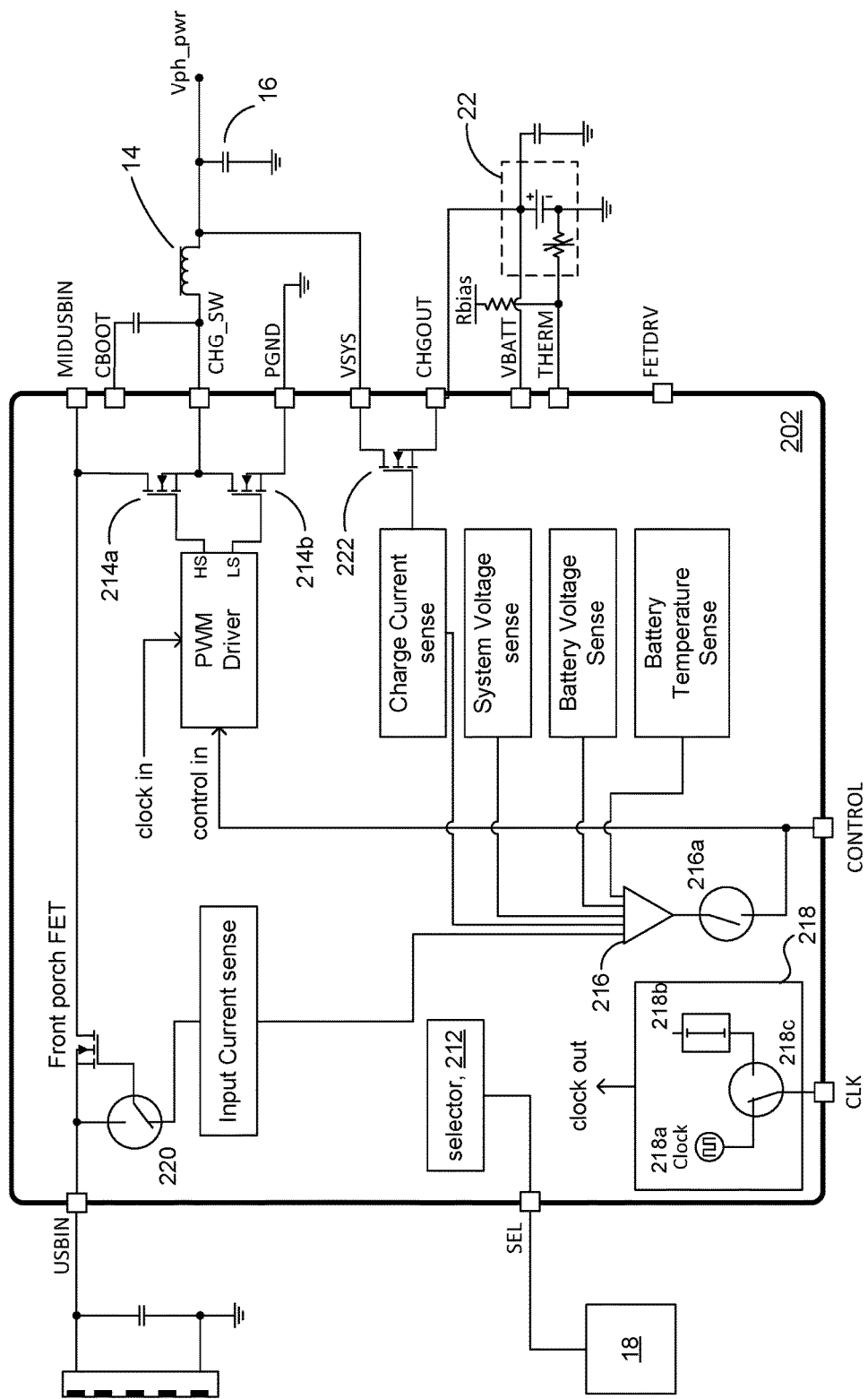
FIG. 2 shows a general view of a charging circuit in accordance with the present disclosure.

The discussion will now turn to details of the battery charging device 102 in accordance with some aspects of the present disclosure. FIG. 2 shows a simplified schematic representation of the battery charging device 102. In some aspects, the battery charging device 102 may comprise a charging IC 202. It will be appreciated that in some implementations, the design of the charging IC may be implemented on two or more ICs. For purposes of discussion, however, we can assume a single charging IC implementation without loss of generality.

The charging IC 202 may comprise circuitry to provide battery charging functionality in accordance with principles of the present disclosure. In some aspects, for example, the battery charging functionality may be provided using a buck converter, or a buck-boost converter, and so on. Accordingly, the charging IC 202 may include a high-side FET 214a and a low-side FET 214b that can be configured in a buck converter topology in conjunction with the inductive element 14 and the capacitive element 16.

A pulse width modulated (PWM) driver circuit may produce gate drive signals (HS, LS) at its switching output to switch the gates of respective FETs 214a and 214b. The PWM driver circuit may receive a current-mode control signal at its control input and a clock signal at its clock input to control the switching of FETs 214a and 214b. Power (Vph_pwr) from the buck converter may be connected to charge the battery 22 through the battery FET 222 via the VSYS and CHGOUT terminals of the charging IC 202. The battery FET 222 may serve to monitor the charge current (e.g., using a charge current sense circuit).

In accordance with principles of the present disclosure, the control signal may be internally generated within the charging IC 202 or externally provided to the charging IC. For example, a feedback compensation network comprising various feedback control loops and a comparator 216 may serve as a source of an internally generated control signal. In a particular aspect, the feedback control loops may include an input current sense circuit (e.g., senses input current at USBIN), a charge current sense circuit (e.g., senses current at VSYS and CHGOUT terminals using battery FET 222), a system voltage sense circuit (e.g., senses voltage at VSYS terminal), a battery voltage sense circuit (e.g., senses battery voltage at VBATT terminal), and a battery temperature sense circuit (e.g., senses battery temperature at THERM terminal). In other aspects, the feedback control loops may comprise fewer, or additional, sense circuits. The comparator 216 may produce a reference that serves as the internally generated control signal.

The control signal produced by the comparator 216 is "internal" in the sense that the control signal is generated by circuitry that comprises the charging IC 202. By comparison, a control signal is considered to be "externally" provided when the signal is received from a source external to the charging IC 202, e.g., via the CONTROL terminal of the charging IC. In some aspects, a control selector 216a may be provided to select either the internal control signal generated by the comparator 216 or an externally generated control signal received on the CONTROL terminal to serve as the control signal for the PWM driver circuit.

In accordance with principles of the present disclosure, the clock signal may be internally generated within the charging IC 202 or externally provided to the charging IC. For example, the charging IC 202 may include a clock generator 218 to produce a clock signal (clock out). The clock generator 218 may include a clock generating circuit 218a and a delay element 218b. The clock generating circuit 218a may produce a clock signal that serves as an internally generated clock signal. The delay element 218b may receive an externally provided clock signal.

The clock signal produced by the clock generating circuit 218a is "internal" in the sense that the clock signal is generated by circuitry that comprise the charging IC 202, namely the clock generating circuit. By comparison, a clock signal is considered to be "externally" provided when the signal is received from a source external to the charging IC 202, e.g., via the CLK terminal of the charging IC. In some aspects, a clock selector 218c may be provided to select either the internal clock signal generated by the clock generating circuit 218a or an external clock signal provided on the CLK terminal and delayed (phase shifted) by the delay element 218b to serve as the clock signal for the PWM driver circuit.

The charging IC 202 may include a selector circuit 212 to configure the charging IC to operate in "master" mode or "slave" mode according to the external selection indicator 18 provided on an SEL input of the charging IC. The selection indicator 18 may be a circuit, or a source of an analog signal (e.g., an analog signal generator) or a digital signal (e.g., digital logic). In some aspects, for example, the selection indicator 18 may be an electrical connection to ground potential, either directly or through a resistive element. The selector circuit 212 may operate the control selector 216a and the clock selector 218c according to the selection indicator 18. The selector circuit 212 may also operate a switch 220 to enable or disable sensing of the current input in accordance with the selection indicator 18.

Figure 3:
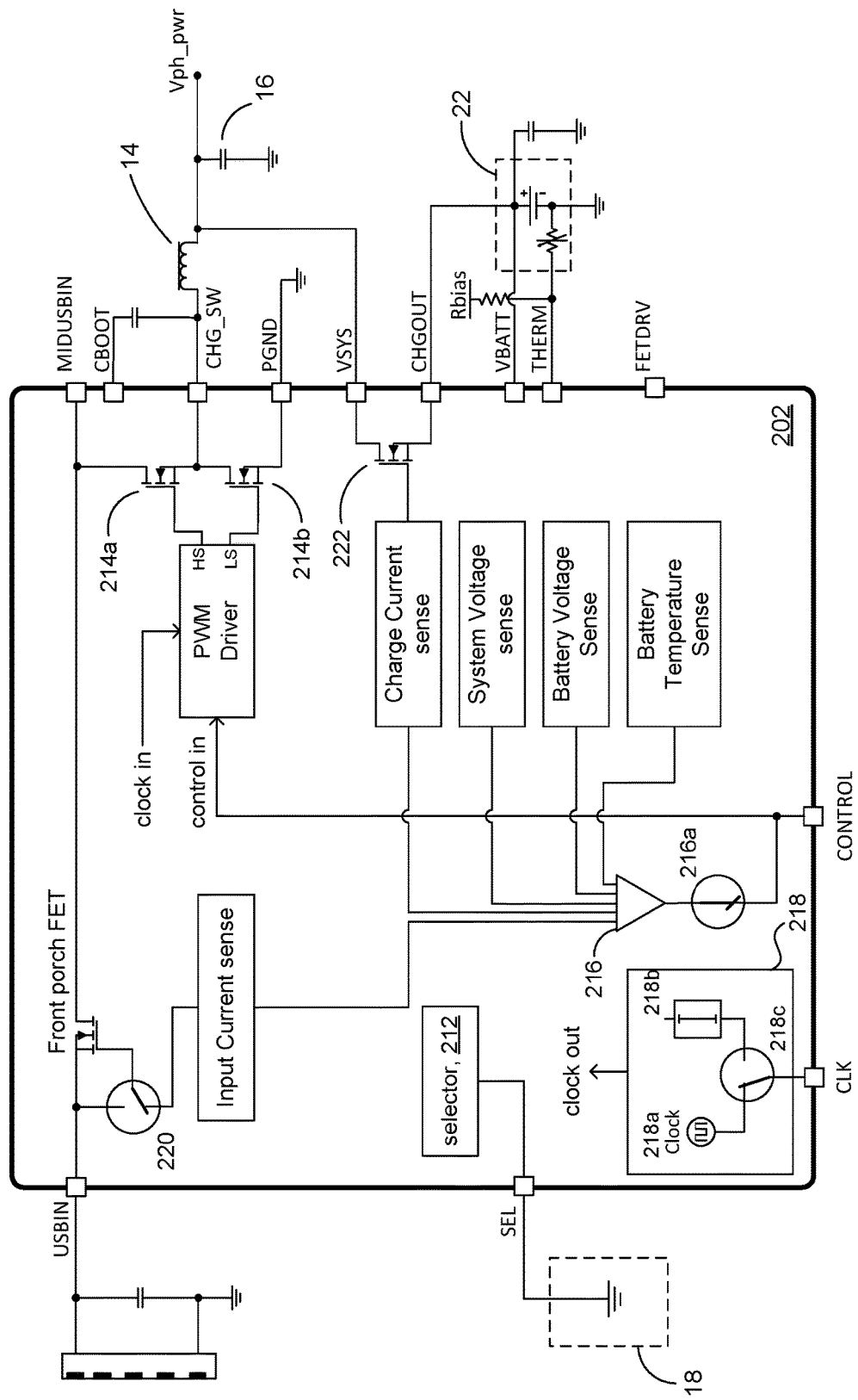
FIG. 3 shows a single-phase configuration of a charging circuit in accordance with aspects of the present disclosure.

In accordance with the present disclosure, the charging IC 202 may be configured as a single-phase standalone device, or used in a multiphase configuration. The discussion will first describe a single-phase configuration. FIG. 3 illustrates an example of the charging IC 202 configured to operate as a standalone battery charger. The charging IC 202 may be configured using the SEL input to operate in master mode. In some aspects, master mode operation in the charging IC 202 may be designated by a selection indicator 18 that comprises a connection of the SEL input to ground potential. This convention for designating master mode operation will be used for the remainder of the disclosure with the understanding that, in other aspects, other conventions may be adopted to indicate master mode operation.

In an aspect, the selector 212 may be configured to respond to the presence of a ground connection at the SEL input by configuring the charging IC 202 for master mode operation. For example, the selector 212 may operate the control selector 216a in a first configuration to provide an internally generated control signal to the control input of the PWM driver circuit. The internally generated control signal is also provided to the CONTROL terminal of the charging IC 202, which for the single-phase configuration shown in FIG. 3 is not relevant.

Similarly, the selector 212 may operate the clock selector 218c in a first configuration to provide an internally generated clock signal (e.g., via the clock generating circuit 218a) to the clock input of the PWM driver circuit. The internally generated clock signal is also provided to the CLK terminal of the charging IC 202, which for the single-phase configuration shown in FIG. 3 is not relevant. The selector 212 may also operate the switch 220 to a configuration that enables input current sensing on the power input USBIN.

In operation, the master-mode configured charging IC 202 shown in FIG. 3 operates as a buck converter to charge the battery 22. Feedback control to the PWM driver circuit is provided by the circuitry comprising the charging IC 202, and likewise, the clock signal to the circuit is provided from within the charging IC. The configuration is a "standalone" configuration in the sense that there is only one charging IC.

Figure 4A:
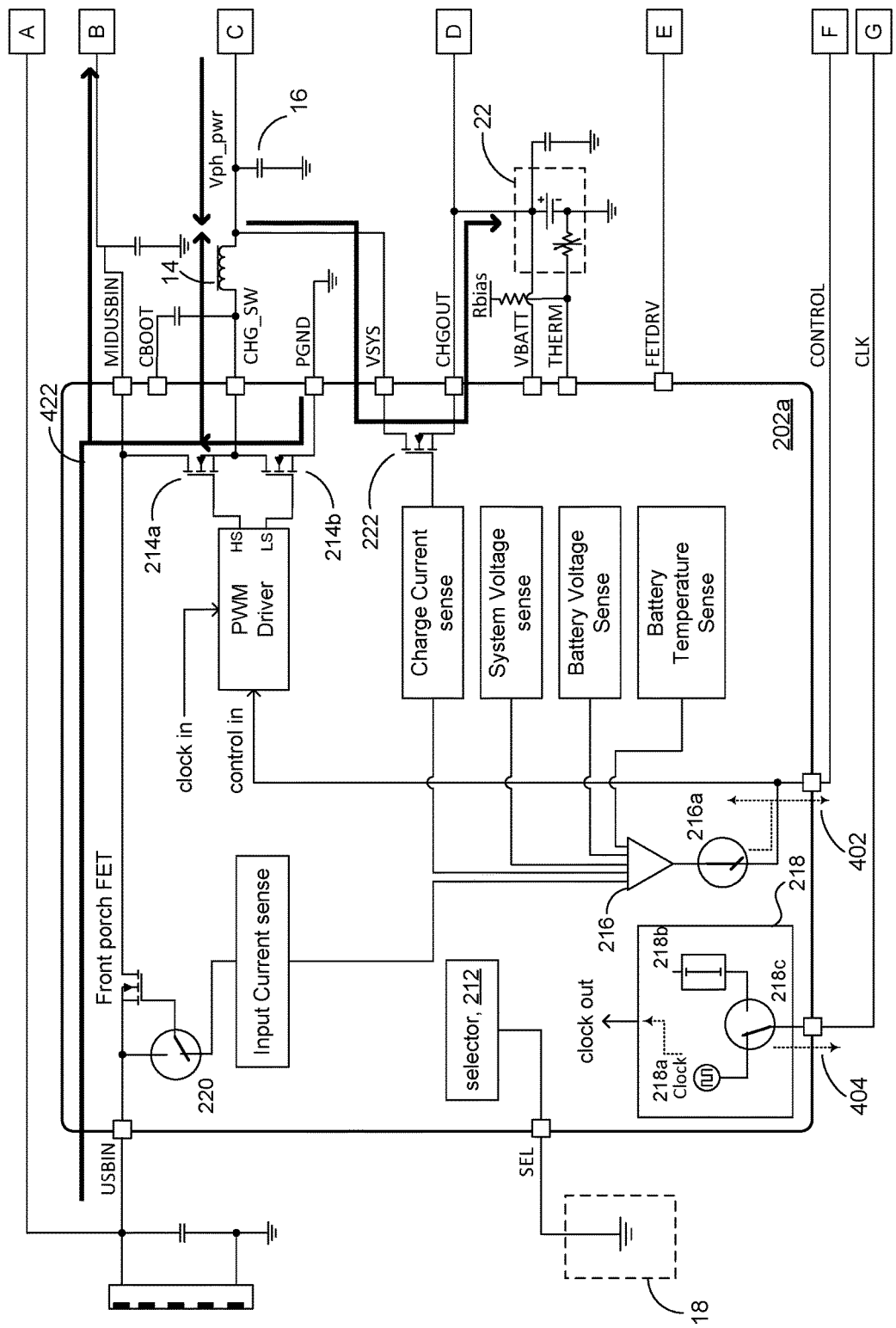
FIGS. 4A and 4B show a dual-phase configuration of charging circuits according to aspects of the present disclosure.
Figure 4B:
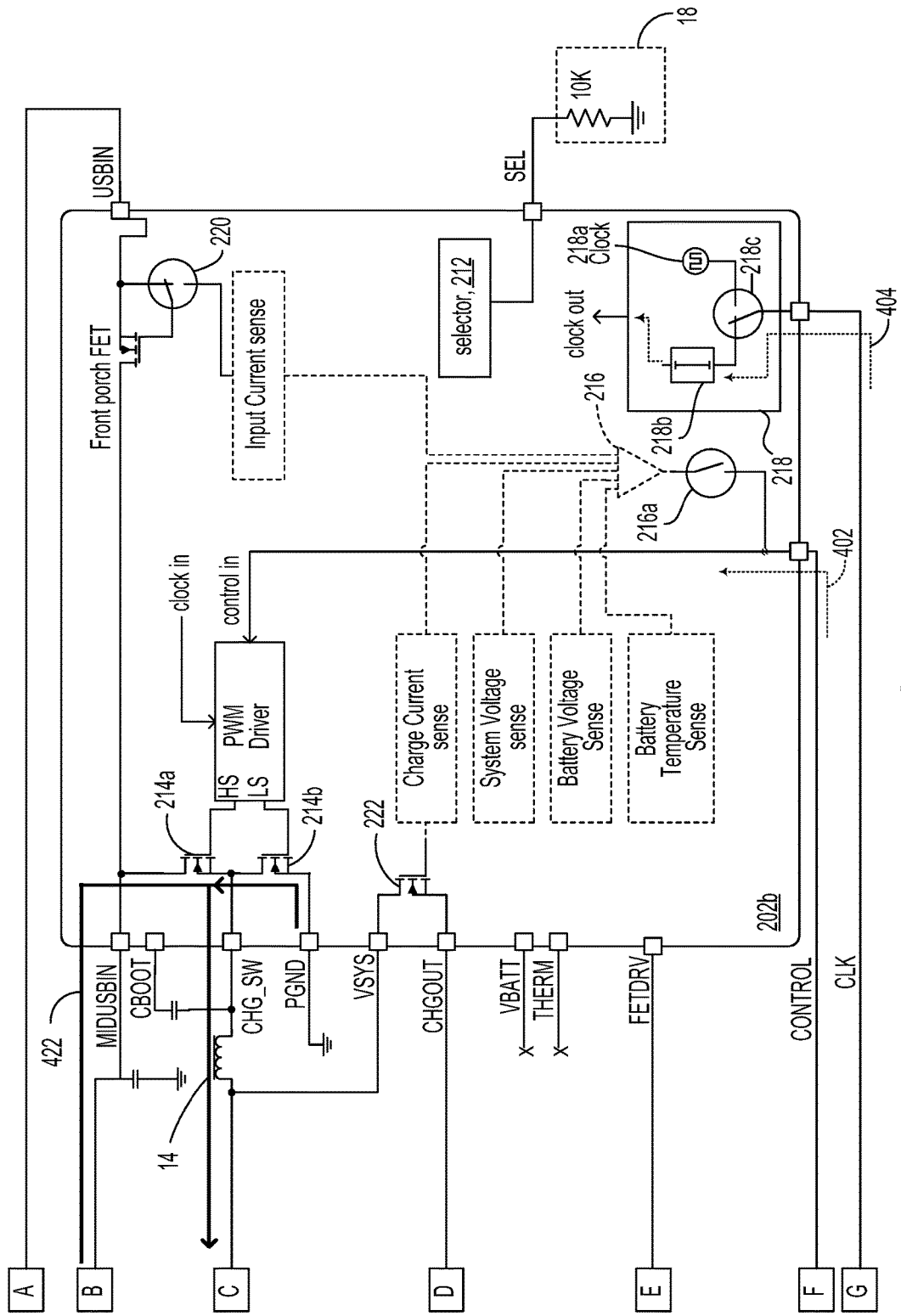

The discussion will now turn to a description of an example of a multiphase configuration of the charging IC 202 in accordance with the present disclosure, and in particular a dual-phase configuration. In a dual-phase configuration, two charging ICs 202 are connected and operate together to charge a battery 22. One of the charging ICs 202 may be configured as a master device and the other as a slave device. FIGS. 4A and 4B show an example of charging ICs 202a and 202b configured to operate respectively as a master device and as a slave device. The charging ICs 202a, 202b are connected together at connections A, B, C, D, E, F, and G. The resulting current flow is illustrated in FIGS. 4A and 4B as flow 422.

The charging IC 202a shown in FIG. 4A is configured for master mode operation as described in FIG. 3. In accordance with the present disclosure, the control signal generated by the comparator 216 in the charging IC 202a is provided as an externally generated control signal 402 (e.g., via the CONTROL terminal), in addition to serving as an internally generated control signal for the PWM driver circuit in the charging IC. Similarly, the clock signal generated by the clock generator 218 is provided as an externally generated clock signal 404 (e.g., via the CLK terminal), in addition to serving as an internally generated clock signal for the PWM driver circuit in the charging IC 202a.

Referring to FIG. 4B, the charging IC 202b is configured for slave mode operation. The charging IC 202b may be configured using the SEL input to operate in slave mode. In some aspects, slave mode operation may be designated by a selection indicator 18 that comprises a resistive element. This convention for designating slave mode operation will be used for the remainder of the disclosure with the understanding that, in other aspects, other conventions may be adopted to indicate salve mode operation. In a particular aspect, for example, a 10K resistor may be used to indicate slave mode operation. It will be appreciated, of course, that another resistance value may be used. The selector 212 may be configured to respond to the detection of a 10 KΩ resistance at the SEL input by configuring the charging IC 202b for slave mode operation.

In slave mode operation, the selector 212 may operate the control selector 216a in a second configuration to receive the externally generated control signal 402 that is received on the CONTROL terminal of the charging IC 202b. The control selector 216a provides the externally generated control signal 402 to the control input of the PWM driver circuit. Operation of the control selector 216a in the second configuration disconnects or otherwise effectively disables the feedback network in the charging IC 202b from the PWM driver circuit. This "disconnection" is emphasized in the figure by illustrating the elements of the feedback network in the charging IC 202b using broken grayed out lines.

The selector 212 in the charging IC 202b may also operate the clock selector 218c in a second configuration to receive the externally generated clock signal 404 on the CLK terminal. The clock selector 218c provides the externally generated clock signal 404 to the delay element 218b. The clock signal that is provided to the PWM driver circuit comes from the delay element 218b, thus disconnecting or otherwise effectively disabling the clock generating circuit 218a in the charging IC 202b.

The switch 220 may be configured (e.g., by the selector 212) to disable current sensing at the USBIN terminal of the charging IC 202b. Power to the high- and low-side FETs 214a, 214b may be provided by the MIDUSBIN terminal via connection B. Similarly, charge current sensing in the slave-configured charging IC 202b may be disabled by disabling its battery FET 222.

As can be appreciated from the foregoing description, operation of the PWM driver circuit in the slave-mode charging IC 202b is controlled by the control signal and clock signal that is generated in the master-mode charging IC 202a and provided to the slave-mode charging IC 202b, respectively, as externally generated control and clock signals 402, 404. From the point of view of the slave-mode charging IC 202*b*, the control and clock signals generated in the master-mode charging IC 202*a* are deemed to be "externally generated."

The master-mode charging IC 202*a* may synchronize with the slave-mode charging IC 202*b* by asserting a signal on the FETDRV terminal. For example, when the master-mode charging IC 202*a* pulls the FETDRV terminal LO, the PWM driver circuit in the slave-mode charging IC 202*b* is disabled. When the master-mode charging IC 202*a* pull the FETDRV terminal HI, the PWM driver circuit in the slave-mode charging IC 202*b* begins switching. In some aspects, the FETDRV terminal may be used by the master-mode charging IC 202*a* to initiate switching in the slave-mode charging IC 202*b* after the input current rises above a threshold level, in order to balance light-load and heavy-load efficiency. For example, switching losses at light load can outweigh the decreased conduction losses, which can be avoided by not enabling the slave-mode charging IC 202*b* right away. After enablement, the slave-mode charging IC 202*b* will operate in synchrony with the clock signal from the master-mode charging IC 202*a*. Control of the PWM driver circuit in the slave-mode charging IC 202*b* will be provided by the control signal from the master-mode charging IC 202*a*, thus allowing the master to set the charge current limit, input current limit, etc.

In accordance with the present disclosure, the delay element 218*b* may be configured (e.g., by the selector 212) to provide a selectable phase shift that is suitable for dual-phase operation. For example, the delay element 218*b* may provide a 180° phase shift of the externally generated clock signal 404. Accordingly, the clock signal provided to the clock input of the PWM driver circuit in the slave-mode charging IC 202*b* is 180° out of phase relative to the clock signal in the master-mode charging IC 202*a*. Consequently, the charging cycle of the master-mode charging IC 202*a* will be 180° out of phase relative to the charging cycle of the slave-mode charging IC 202*b*. For example, when the high-side FET 214*a* is ON in the master device, the high-side FET in the slave device is OFF, and vice-versa.

The dual-phase configuration of charging circuits shown, for example, in FIGS. 4A and 4B, involves additional master and slave circuits to try to provide the dual-phase charging capabilities. In addition, the charging IC 202 shown in FIG. 3 and the charging ICs 202*a* and 202*b* shown in FIGS. 4A and 4B generally operate as a buck converter to charge the battery 22. This additional circuitry, however, may involve additional cost and complexity, for example, to provide communication/synchronization between the charging ICs. That is, the dual-phase charging functionality provided by the charging ICs 202*a* and 202*b* shown in FIGS. 4A and 4B involves additional IC and/or external components.

Figure 5:
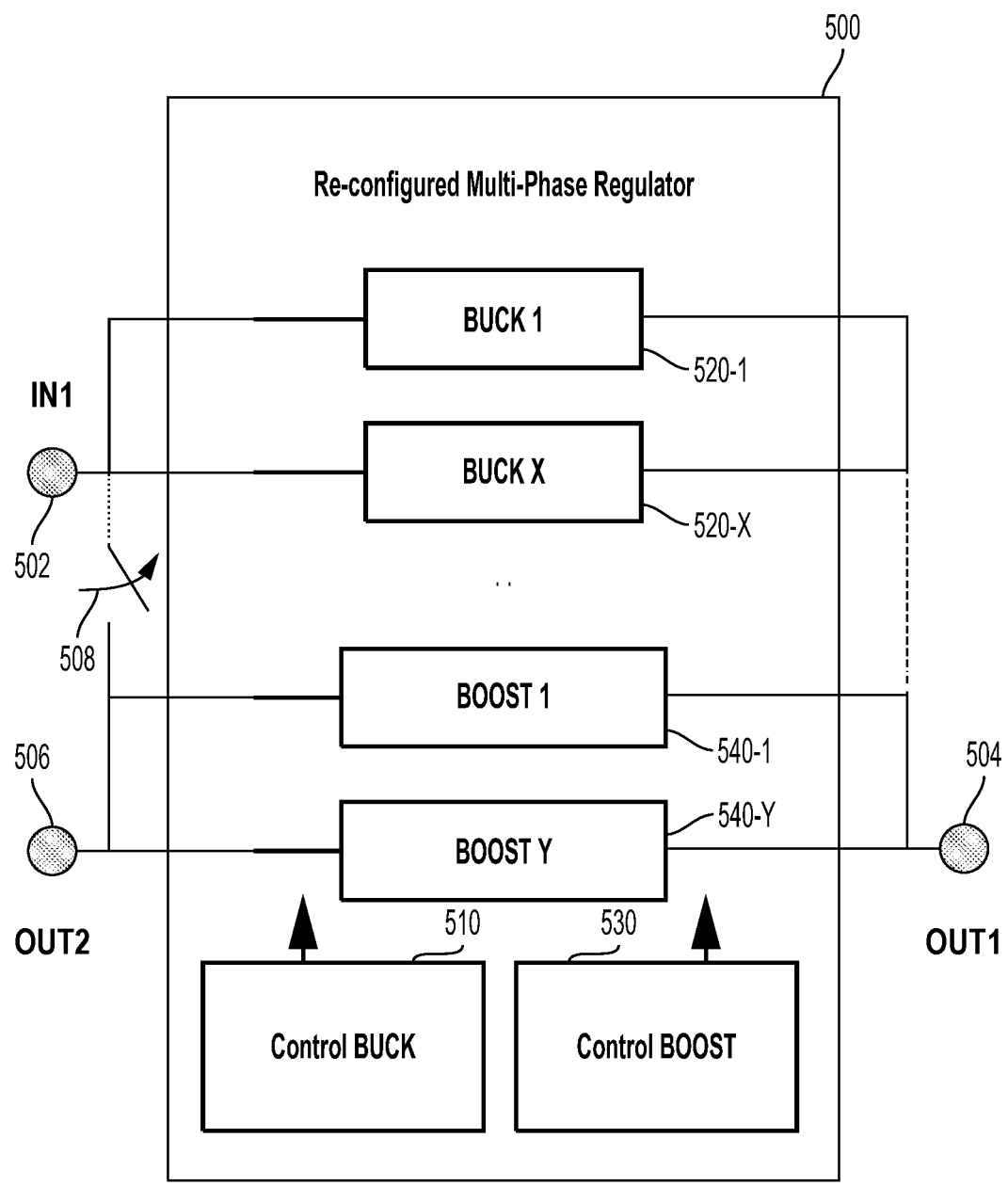
FIG. 5 is a diagram a of single power management component including a multiphase switch mode regulator for concurrently charging a battery and powering a peripheral device according to aspects of the present disclosure.

FIG. 5 is a diagram a of single power management component including a multiphase switch mode regulator 500 for concurrently charging a battery and powering a peripheral device, according to aspects of the present disclosure. In this aspect of the present disclosure, the multiphase switch mode regulator 500 is reconfigurable to provide current charging and peripheral device power operations, such that each of N-phases may be reconfigured to X-Buck or Y-Boost, where N=X-Buck+Y-Boost. It should be recognized that the passive R/L/C components are not shown to avoid obscuring details of the present disclosure. It should be noted that each regulator or converter of the multiphase switch mode regulator 500 can be configured according to a buck mode of operation (e.g., buck phase) and a boost mode of operation (e.g., boost phase). Thus, in some implementations, a first regulator or converter may be configured in accordance with a buck mode of operation (buck phase) and a second regulator may be configured in accordance with a boost mode of operation (boost phase). Alternatively, the first regulator or converter may be configured in accordance with a boost mode of operation (boost phase) and the second regulator may be configured in accordance with a buck mode of operation (buck phase). Although the ports are described as separate input and output ports, one or more of the ports may be an input/output (I/O) port that functions as an input port during a boost mode and an output port during a buck mode.

Representatively, the multiphase switch mode regulator 500 includes parallel buck converters 520 (520-1, . . . , 520-X) and parallel boost converters 540 (540-1, . . . , 540-Y) arranged between an input port 502 (IN1), a first output port 504 (OUT1) and a second output port 506 (OUT2). In operation, the selection of the parallel buck converters 520 and the parallel boost converters 540 may be determined by a controller. The controller may include a buck controller 510 and a boost controller 530. For example, the selection of the parallel buck converters 520 and the parallel boost converters 540 to charge the first output port 504 is determined by the buck controller 510 to provide a desired power specification according to N-output voltages. In this case, the buck controller allocates the parallel buck and boost stages according to power specifications. For example, an attachment of a high power adapter to the input port may enable configuration of the multiple phases as buck converters to enable a fast charge operation of a load such as a battery. In this aspect of the present disclosure, the second output port 506 is selectively coupled to the input port 502 through a switch 508.

In one arrangement, a peripheral device cable may be attached to the second output port 506 according to, for example, an on-the-go (OTG) operation mode. For example, attachment of an OTG peripheral device cable to the second output port 506 may be detected by the boost controller 530. Upon detection of the OTG device cable, the switch 508 may be opened to disconnect the first input port 502. Opening of the switch 508 drives the buck phase 1 and buck phase X to the first output port 504 to charge, for example, a battery attached to the first output port 504. Simultaneously, boost phase 1 and boost phase Y may drive the second output port 506 to concurrently power the peripheral device (e.g., OTG peripheral device) through the OTG device cable coupled to the second output port 506.

Figure 6A:
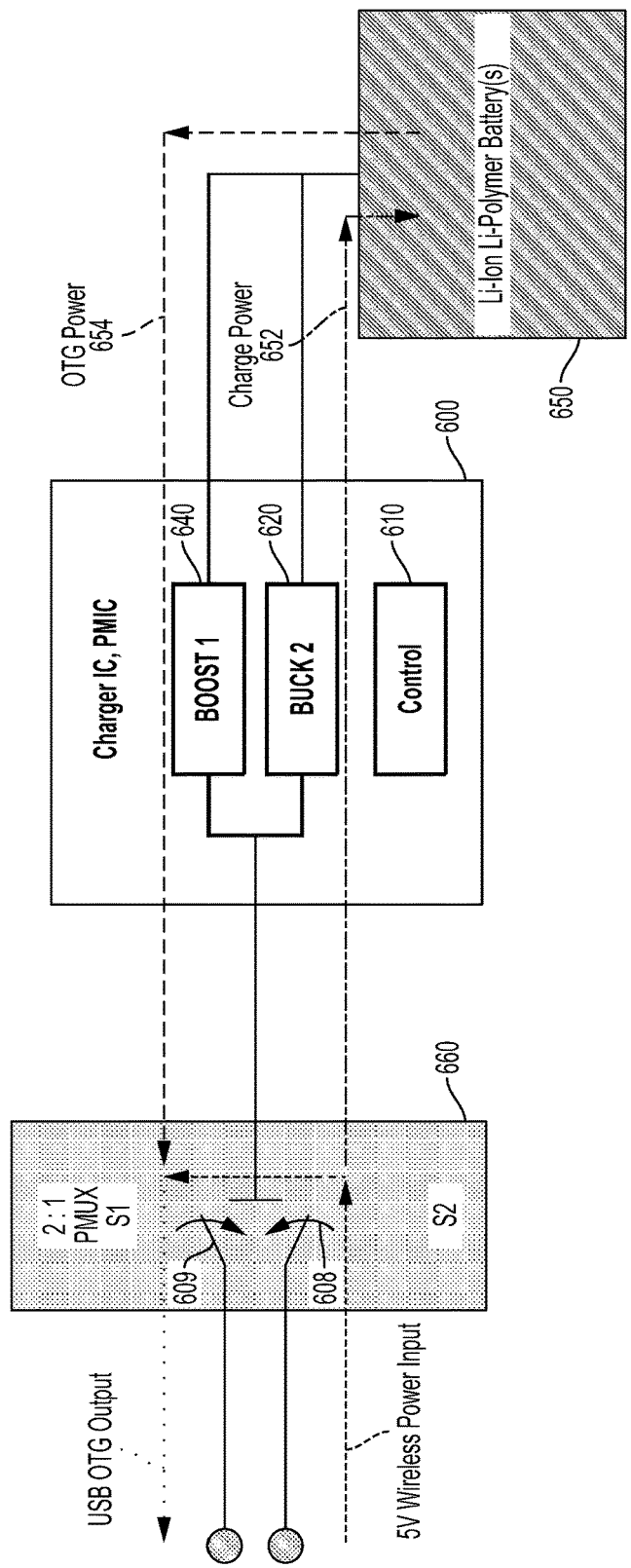
FIG. 6A shows a dual-phase configuration of a single power management component including a dual-phase switch mode regulator for a concurrent powering operation of a peripheral device according to aspects of the present disclosure.

FIG. 6A shows a dual-phase configuration of a single power management component (e.g., a power management IC (PMIC)) including a dual-phase switch mode regulator 600 (or dual-phase integrated circuit (IC)) for concurrent charging and powering operations according to aspects of the present disclosure. In this arrangement, the dual phase switch mode regulator 600 includes a buck converter 620 in parallel with a boost converter 640. A battery 650 is coupled to an output port. In operation, the selection of the buck converter 620 and the boost converter 640 is determined by a controller 610 to charge the battery 650 according to a desired power specification.

In this aspect of the present disclosure, a wireless charger 660 is selectively coupled to the dual-phase switch mode regulator 600 through a first switch 608 and a second switch 609. In one arrangement, a peripheral device cable may be attached to the wireless charger 660 according to, for example, an OTG operation mode. Attachment of an OTG peripheral device cable to the wireless charger 660 may exceed an OTG power 654 provided by the battery 650, resulting in the closure of the first switch 608 and the second switch 609. Upon detection of closure of the switches 608 and 609, the controller 610 activates the boost converter 640 to boost the OTG power 654 and deactivate the buck converter 620 to eliminate a charge power 652. Alternatively, the controller 610 may activate the boost converter 640 to concurrently power the OTG peripheral device while the buck converter 620 generates the charge power 652 for the battery 650.

Some implementations suffer from high loss during concurrent charging of a high power consumption client device (e.g., light emitting diode (LED) torch) and battery charging. The high loss occurs when a power source, such as a high-voltage dedicated charging port (HVDCP), concurrently charges the battery through a buck converter and the LED torch through a current source. The loss is increased when the LED) torch is on during the concurrent charging. The current source is subject to high loss during the charging of the LED torch. Accordingly, it is desirable to charge the light emitting diode (LED) torch while reducing the loss associated with the concurrent charging.

Figure 6B:
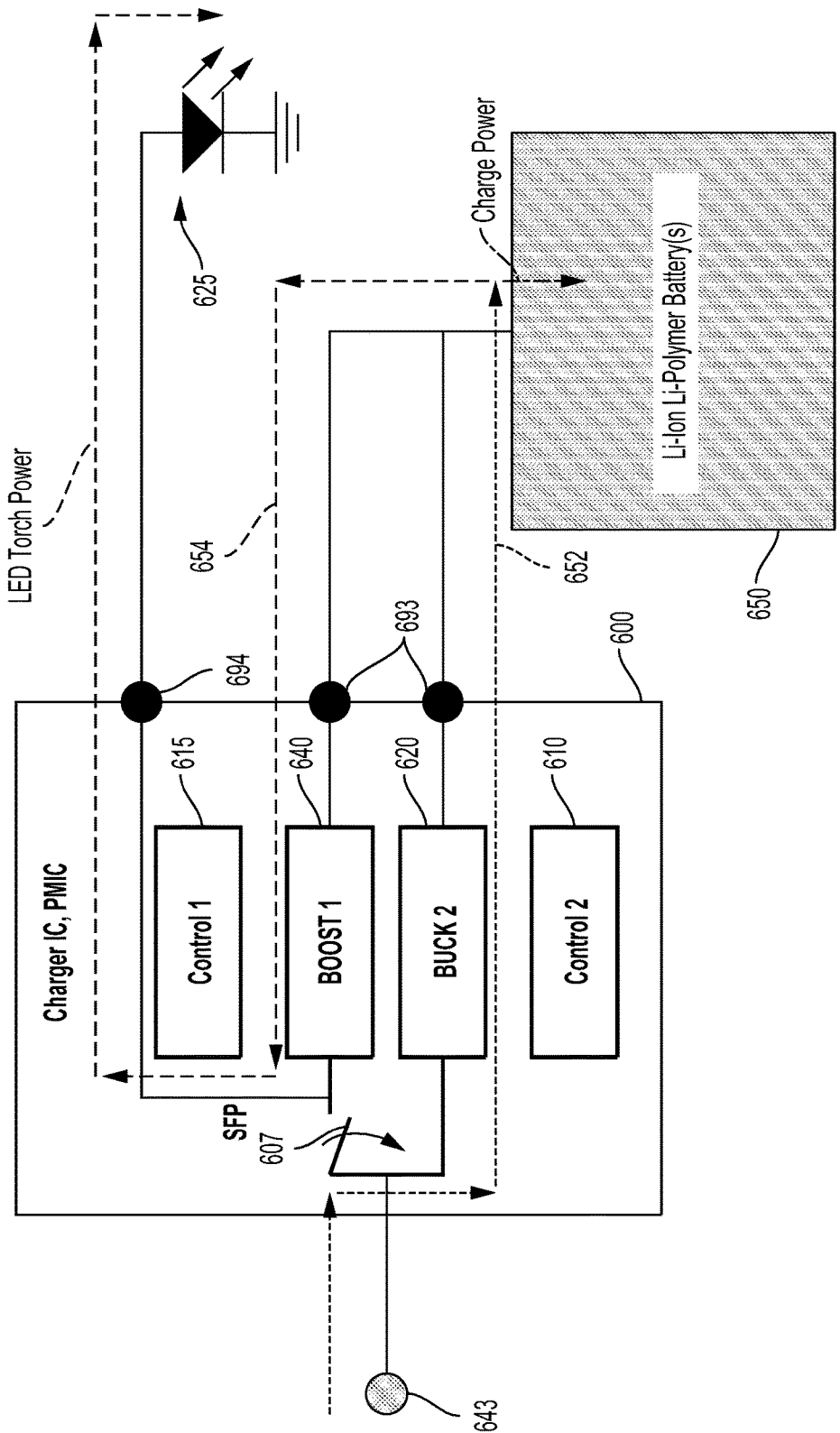
FIG. 6B shows a dual-phase configuration of a single power management component including a dual-phase switch mode regulator for a concurrent powering operation of a peripheral device according to aspects of the present disclosure.

FIG. 6B shows a dual-phase configuration of a single power management component including a dual-phase switch mode regulator 600 for concurrent charging of a battery 650 and powering operation of a high power consumption client device 625 according to aspects of the present disclosure. For illustrative purposes, some of the labelling and numbering of the devices and features of FIG. 6B are similar to those of the FIG. 6A. The high power consumption device 625 can be any device that consumes higher power relative to other client devices. For example, the high power consumption device 625 may be a white light emitting diode (LED) flash used for a camera.

A first phase of the dual-phase switch mode regulator 600 can be specified to operate as a buck (e.g., buck converter 620) when charging the battery 650. A second phase of the dual-phase switch mode regulator 600 can be specified to operate as a boost (e.g., boost converter 640) when providing power to the high power consumption device 625. However, in the boost operating phase, the boost converter 640 is not operating as a boost for a peripheral device such as an on-the-go (OTG) device that specifies a higher voltage (e.g., 5V). The higher voltage may be specified to turn on a switch for charging the OTG device. In this case, because the voltage is lower, the switch for charging a load such as the LED torch may be turned on to concurrently power the load while charging the battery.

Similar to the configuration of FIG. 6A, the dual phase switch mode regulator 600 of FIG. 6B includes the buck converter 620 in parallel with the boost converter 640. The battery 650 is coupled to a first I/O port 693 and the high power consumption device 625 is coupled to a second I/O port 694.

In operation, the selection of the buck converter 620 and the boost converter 640 is determined by a controller 610 and a switch device 607. The switch device 607 may be a small form-factor pluggable ($S_{FP}$) switch or an input blocking field effect transistor (FET). For example, the buck converter 620 is selected to charge the battery 650 according to a desired power specification. In this case, the switch device 607 is open or the input blocking FET is reconfigured to open in order to cause the charge or power from a power source 643 to flow through the buck converter 620, through the first I/O port 693 to the battery 650. Concurrently, the high power consumption device 625 is powered by the battery 650 via the boost converter 640 and the second I/O port 694. The power through the boost converter 640 is controlled by a controller 615. Performing the concurrent charge without the implementation of a current source reduces or eliminates hot spots and increase efficiency of the boost implementation for charging the LED torch.

Aspects of the present disclosure are directed to multi-phase (e.g., dual-phase) concurrent configuration of a power management component that supports higher current levels to peripheral devices while maintaining acceptable thermal limits. Some wireless chargers have limited current capability (e.g., 1 ampere (A) or less). When the current demand of the peripheral device exceeds the current specification of the wireless charger, a battery may be used to supplement the current desired by the peripheral device. For example, current specification of some peripheral devices (e.g., 2 A) can be higher than the capability of the wireless chargers. Because these wireless chargers are incapable of sufficiently charging the peripheral devices (as well as a battery), further implementations are introduced to supplement current or charge to the peripheral device. For example, a phase of the power management component can be specified to operate as a buck when charging the battery and another phase as a boost when supplementing the current for the peripheral device. Although a dual-phase configuration is described, aspects of the present disclosure may be implemented with a multiphase (e.g., three, four, five and so on) configuration.

According to an aspect of the present disclosure, the dual-phase concurrent configuration improves a transition from buck mode to a boost mode and vice versa. As a result, transient response of the charge current is also improved when a first phase of the power management component is operated according to a boost mode and the second phase is operated according to a buck mode. To operate under these conditions, standby modes for both the buck and the boost modes are selectively activated. In the standby mode, the converter output is high impedance (tristate), but a control loop coupled to the converter (e.g., for providing control input to the converter), bias and references are all active. This allows the converter to wake up quickly in response to changing conditions.

The selective activation of the standby modes is supported by communication between switches and other devices of a multiphase concurrent configuration to reduce or minimize simultaneous buck and boost switching, as illustrated in FIGS. 7A-7D and 8.

It is to be noted that the standby mode corresponds to regulation of the regulator/converter at a low input voltage (e.g., around 5V which is specified for USB travel adapters). In operation, the concurrent presence of an OTG device and a charger is detected by an electronic device. When the OTG device and the charger are concurrently coupled to the electronic device, a power management component or dual-phase switch mode regulator of the electronic device may detect the devices. Upon the detection, the standby mode may be enabled by regulating the boost converter to a voltage, which is lower than a nominal voltage. Regulating at the voltage, which is lower than a nominal voltage, for the standby mode may include regulating the boost converter to about 2-5% below the adapter voltage or nominal voltage. In this case, if the adapter voltage is 5V, then the regulation set point for the boost converter may be 4.75 V. Thus, the voltage regulation at the standby mode is lower than the voltage regulation (e.g., 5V) at the tristate mode; when 100% of the input power is consumed in the OTG load and the battery charger is in standby (or tristate mode). The boost converter may be regulated at a low voltage by adjusting a resistor divider (e.g., resistor divider 802 of FIG. 8) or reducing a reference voltage of an error amplifier (e.g., error amplifier 812 of FIG. 8). By regulating the boost to the voltage, which is lower than the nominal voltage when the buck is on, the boost is forced into tristate mode. Thus the buck and boost do not run at the same time.

Figure 7A:
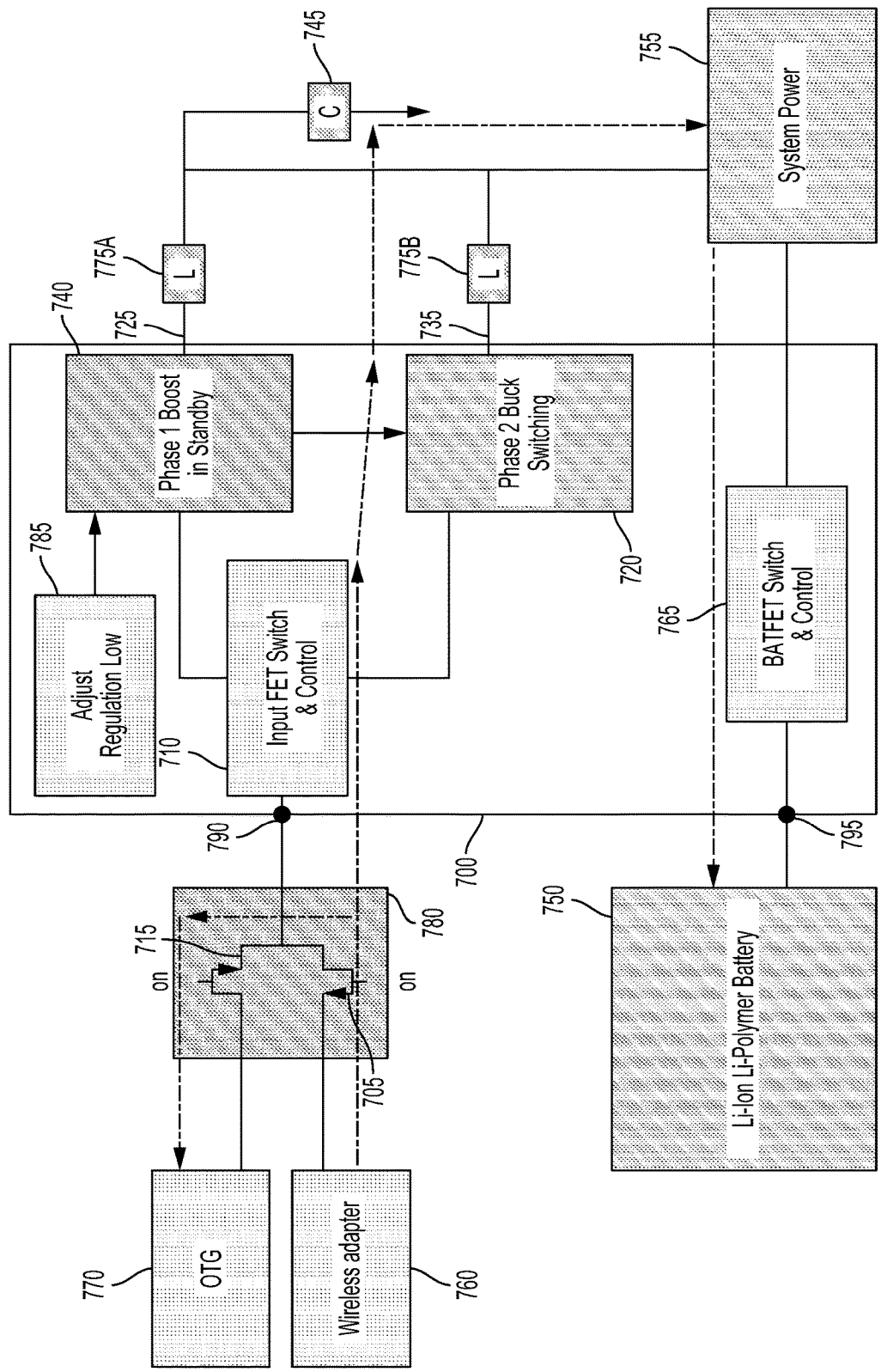
FIG. 7A shows a dual-phase concurrent configuration of a power management component for concurrently charging and powering a peripheral device according to aspects of the present disclosure.

FIG. 7A shows a dual-phase concurrent configuration of a power management component 700 (e.g., multiphase regulator) for concurrently charging and powering a peripheral device according to aspects of the present disclosure. The dual-phase configuration (dual-phase integrated circuit (IC) configuration) includes two charging ICs 720, 740 that are connected and operate together to charge a battery 750. The charging ICs 720, 740 (e.g., dual-phase voltage regulators) may comprise circuitry to provide battery charging functionality that may be provided using a buck converter or a boost converter. In this aspect, the charging IC (e.g., first regulator), which corresponds to phase 1 of the dual-phase concurrent configuration, is a boost converter 740. In this case, phase 1 can be referred to as a boost phase. The charging IC (e.g., second regulator), which corresponds to phase 2 of the dual-phase concurrent configuration, is a buck converter 720. In this case, phase 2 can be referred to as a buck phase. Although a dual-phase configuration (dual-phase integrated circuit (IC) configuration) is described, aspects of the present disclosure may be implemented with a multiphase (e.g., three, four, five and so on) configuration.

It is to be noted that each of the first regulator and the second regulator can be operable in accordance with the buck phase or the boost phase. For example, the first regulator is operable in accordance with the buck phase or the boost phase during an active state and in accordance with a tristate during an inactive phase. The tristate allows the boost converter to assume a high impedance state in addition to a boost mode and a disabled mode. Aspects of the disclosure allow the first regulator and the second regulator to substantially reduce or prevent overlap between the buck phase and the boost phase.

An output port 725 of the boost converter 740 is coupled to system power 755 via a first inductor 775A. Similarly, an output port 735 of the buck converter 720 is coupled to the system power 755 via a second inductor 775B. The first inductor 775A and the second inductor 775B are further coupled to ground via a capacitor 745. The system power 755 is coupled to the battery 750 through a battery FET (BatFET) switch and control 765.

An input field effect transistor (FET) switch and control 710 is coupled to the boost converter 740, the buck converter 720 and a switching device 780 (e.g., switch). For example, the switching device 780 may be coupled to an I/O port 790. The input FET switch and control 710 may be integrated together into a single device, as shown. Alternatively, the input FET switch and control 710 may be separate but coupled together. Further, a wireless charger (e.g., a wireless adapter) 760 and/or a peripheral device 770 are selectively coupled to the buck converter 720 and the boost converter 740 via the switching device 780 and the input FET switch and control 710. Although a wireless adapter 760 is described, aspects of the present disclosure may be implemented with a wired adapter. The switching device 780 selectively couples the first regulator and the second regulator to the wireless adapter 760 and/or peripheral device 770 via the I/O port 790. The switching device 780 includes a first transistor 705 and a second transistor 715 for switching a connection(s) of the wireless adapter 760, the peripheral device 770 and the input FET switch and control 710. For example, the selective coupling (e.g., via the switching device 780) allows the dual-phase voltage regulator to selectively provide power (i) from a first I/O port (e.g., I/O port 795) to a second I/O port (e.g., I/O port 790) to provide power to the peripheral device or (ii) to provide power from the second I/O port to the first I/O port to provide power to the battery. For example, the input FET switch and control 710 and/or the switching device 780 selectively couple the first regulator and the second regulator to the I/O port 790.

The power management component 700 further includes a voltage regulation adjustment device 785. The controller, including the voltage regulation adjustment device 785, is configured to cause the boost converter 740 to enter a standby mode or a switching mode depending on the system state. The system state may correspond to charging of the battery by the wireless adapter 760, providing power to the peripheral device 770 by the wireless adapter 760 and/or the battery 750, etc. In one aspect of the disclosure, the voltage regulation adjustment device 785 may be independent but coupled to the controller.

Phase 1 and phase 2 of the dual-phase concurrent configuration of a power management component 700 may be maintained in one or more modes based on a system state. For example, phase 1 can be maintained in boost mode, buck mode, standby mode or disabled mode. Similarly, phase 2 can be maintained in boost mode, buck mode, standby mode or disabled mode.

In one aspect of the disclosure, phase 1 may be maintained in boost mode or boost standby mode based on the system state. Phase 2 may be maintained in buck mode or buck standby mode based on the system state. In the boost mode, the boost converter 740 provides power to the peripheral device 770. In the buck mode, the buck converter 720 provides a charge to the battery 750. I/O port 790 may be an I/O port. Similarly, I/O port 795 may also be an I/O port. For example, I/O port 795 functions as an input port to receive power from the battery 750 and as an output port to provide charge to the battery 750. Similarly, I/O port 790 functions as an input port to receive a charge from the wireless adapter 760 and as an output port to supply power to the peripheral device 770.

Because of the desire to speed up an activation of the boost mode when the boost converter 740 changes states, the boost converter 740 is not disabled. For example, the boost converter 740 is not disabled when the boost converter 740 is not providing charge or power to the peripheral device 770. Rather, the boost converter 740 is maintained in a boost standby mode. In the boost standby mode, a boost soft start is already completed and a boost reference or feedback is set to regulate slightly below a voltage of the wireless adapter 760 (or charger).

Similarly, the buck converter 720 is not disabled when the buck converter 720 is not providing charge or power to the battery 750. Rather, the buck converter 720 is maintained in a buck standby mode. Although buck switching is disabled in the buck standby mode, the buck mode may be started again without a new soft start.

In FIG. 7A, the buck converter 720 of the power management component is operated in accordance with a buck mode while the boost converter 740 is operated in accordance with a standby mode. In this mode of operation, the battery 750 and the peripheral device 770 receive a charge from the wireless adapter 760.

In operation, the peripheral device 770 may be powered by the wireless adapter 760. In some instances, because a current (2A) specification of the peripheral device 770 exceeds a current specification (1A) of the wireless adapter 760, charging the peripheral device 770 may be supplemented by the battery 750. Although the current specification for the peripheral device 770 is above that of the wireless adapter 760, the current demand for the peripheral device 770 may be much smaller than the current specification. For example, the current demand for the peripheral device 770 may be 10 mA. Accordingly, the wireless adapter 760 can charge the battery 750 and provide the 10 mA to the peripheral device 770 without a concern. In some instances, when the current demand from the peripheral device 770 is very small (e.g., 10 ma) the output voltage of the wireless adapter 760 is essentially equal to (albeit slightly larger than) the output voltage of the peripheral device 770.

In this mode of operation, the charge to the peripheral device 770 flows from the wireless adapter 760 through the first transistor 705 of the switching device 780, through the second transistor 715 of the switching device 780 to the peripheral device 770. The charge to the battery 750 flows from the wireless adapter 760 through the first transistor 705 of the switching device 780, through input FET switch and control 710, through the buck converter 720, through the second inductor 775B, through the system power 755, through the BatFET switch and control 765 to the battery 750. For example, the controller (e.g., voltage regulation adjustment device 785) is operable to transition the first regulator (in this case, the boost converter 740) from the boost phase into the tristate and also to transition the second regulator (in this case, the buck converter 720) to the buck phase when the demand current from the peripheral device 770 is less than the maximum current available from the wireless adapter 760.

Further, the controller is operable to transition the second regulator (e.g., buck converter 720) from the active state to the tristate to terminate the buck phase of the battery charging operation, and to transition the first regulator (e.g., boost converter 740) from the tristate to the active state to power the I/O port 790 using the boost phase. The boost phase may be activated from standby of the first regulator.

Furthermore, current from the wireless adapter 760 is concurrently supplied to the peripheral device 770 and the battery 750 according to the buck phase of the battery charging operation when the peripheral device 770 draws an amount of current that is less than an amount of current provided by the wireless adapter 760.

Figure 7B:
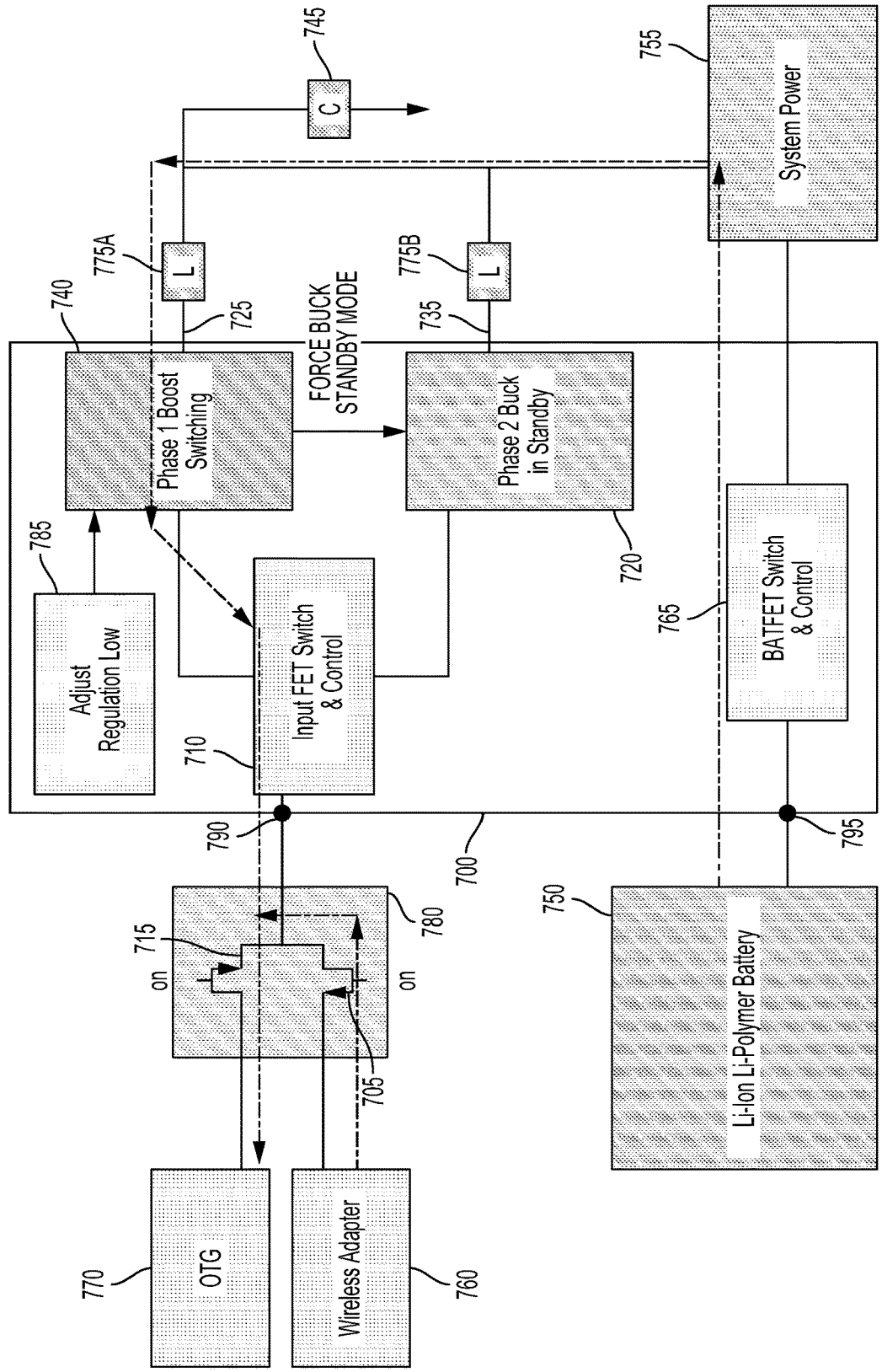
FIG. 7B shows a dual-phase configuration of a power management component for concurrently powering a peripheral device according to aspects of the present disclosure.

FIG. 7B shows a dual-phase concurrent configuration of a power management component for powering a peripheral device according to aspects of the present disclosure. The devices of the dual-phase concurrent configuration of FIG. 7B are the same as the devices of the dual-phase concurrent configuration of FIG. 7A. The mode of operation of the power management component 700 of FIG. 7A, however, is different for that of FIG. 7B.

For example, in FIG. 7B, the boost converter 740 of the power management component 700 is operated in accordance with a boost mode while the buck converter 720 is operated in accordance with a standby mode. In this mode of operation, the battery 750 and the wireless adapter 760 provide a charge to the peripheral device 770.

In operation, the peripheral device 770 may be powered by the wireless adapter 760. In some instances, because a current (2A) specification of the peripheral device 770 exceeds a current specification (1A) of the wireless adapter 760, charging the peripheral device 770 is supplemented by the by the battery 750. For example, if the peripheral device demands a current of 2A, the wireless adapter 760 provides 1A and the battery 750 provides the other 1A. To support this mode of operation, the second phase (buck) of the power management component is switched to a standby mode and the first phase (boost) of the power management component is switched to boost mode to charge the peripheral device 770. For example, a controller is operable to activate a boost phase or mode to power the second I/O port in response to detecting a demand current of the peripheral device exceeding a maximum current available from the adapter. The boost phase may be activated from a standby phase. The controller may also be operable to terminate a buck phase or mode of a battery charging operation when the demand current from the peripheral device exceeds the maximum current available from the adapter.

In this mode of operation, the power from the wireless adapter 760 to the peripheral device 770 flows from the wireless adapter 760, through the first transistor 705 of the switching device 780, through the second transistor 715 of the switching device 780 to the peripheral device 770. The charge from the battery 750 to the peripheral device 770 flows from the battery 750 through the BatFET switch and control 765, through the system power 755, through the first inductor 775A, through the boost converter 740, through input FET switch and control 710, through the second transistor 715 of the switching device 780 to the peripheral device 770.

Thus, in one aspect of the disclosure, the input FET switch and control 710 and/or the switching device 780 are configured to selectively couple the first regulator (e.g., the boost converter 740) to the I/O port 790 in the boost phase to power the peripheral device 770 or to selectively couple the second regulator (e.g., the buck converter 720) to the I/O port 790 in the buck phase to charge the battery 750. Further, the input FET switch and control 710 and/or the switching device 780 are configured to couple the I/O port 790 to the first regulator and to the second regulator when both regulators operate in the buck phase to charge the battery 750. In this case, the peripheral device 770 may be unavailable. Because the wireless adapter may be a wireline adapter that can generate more power, the battery can be charged faster when both regulators operate in the buck phase.

Figure 7C:
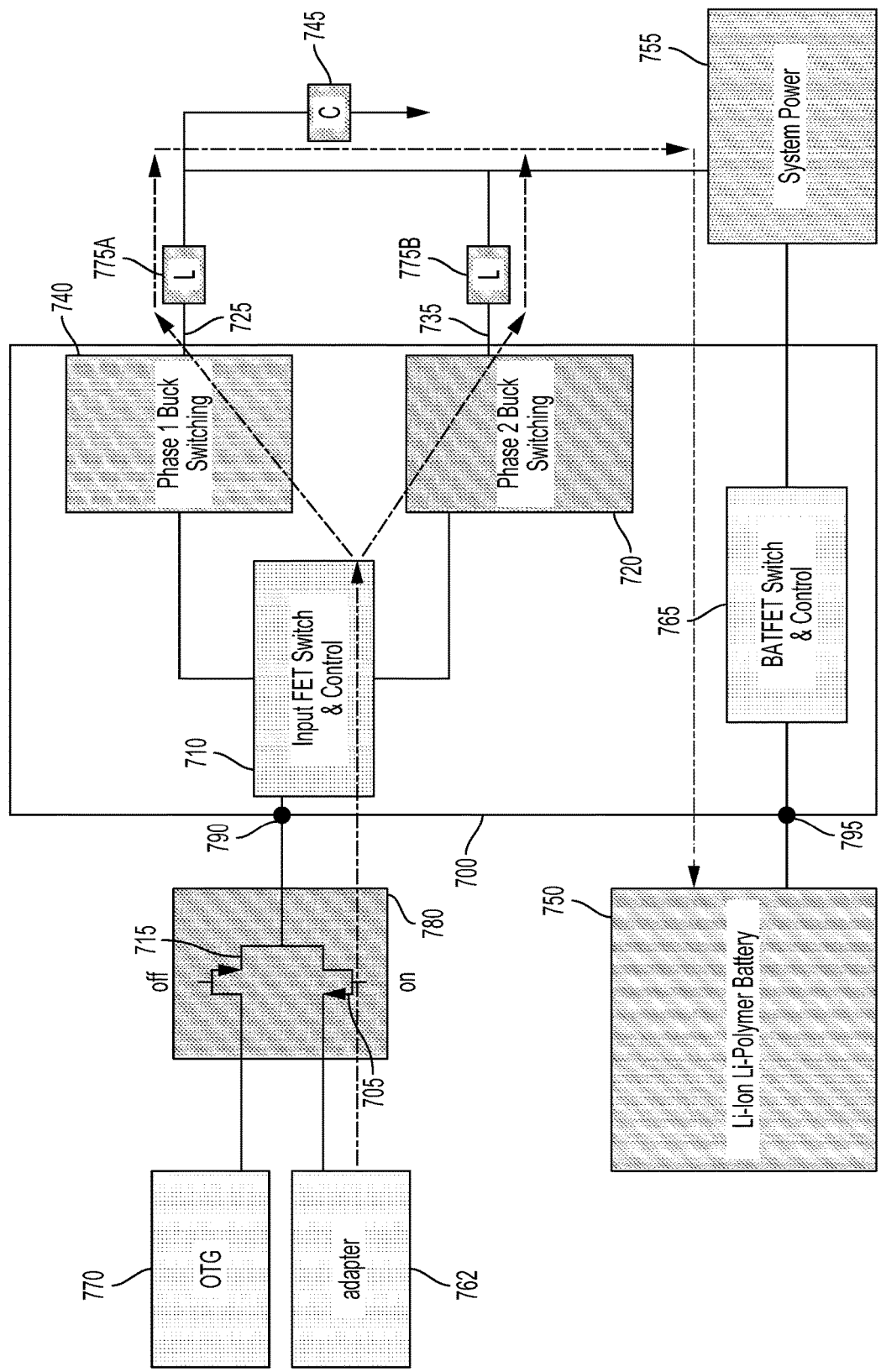
FIG. 7C shows a dual-phase concurrent configuration of a power management component for simultaneously charging with both phases according to aspects of the present disclosure.

FIG. 7C shows a dual-phase configuration of a power management component for simultaneously charging with both phases according to aspects of the present disclosure. For illustrative purposes, some of the labelling and numbering of the devices and features of FIG. 7C are similar to those of the FIGS. 7A and 7B. The illustration of FIG. 7C, however, does not include the voltage regulation adjustment device 785 because the charging IC 720 and the charging IC 740 do not enter a standby mode as both charging ICs 720 and 740 are used to charge the battery 750.

In one aspect of the present disclosure, the power management component 700 may be operating in accordance with a system state/mode that corresponds to an expedited charging of the battery 750 (e.g., expedited charging mode of operation) by the adapter 762. The adapter 762 may be a high power adapter such as a Type C adapter. In this aspect, the charging ICs 720 and 740, which corresponds to phase 1 and phase 2, respectively, of the dual-phase concurrent configuration, are buck converters or are both configured as buck converters for the purpose of expediting the charging of the battery 750. In this case, phase 1 and phase 2 can be referred to as buck phases. Further, the charger (e.g., adapter) 762 is coupled to the buck converter 720 and the buck converter 740 via the switching device 780 and the input FET switch and control 710. For example, the first transistor 705 is turned on while the second transistor 715 is turned off to direct power supply (e.g., current and/or voltage) from the adapter 762 to be directed to the buck converters 720 and 740 and not to the peripheral device 770.

For example, the coupling (e.g., via the switching device 780) allows the dual-phase voltage regulator to provide power from the I/O port 790 to the I/O port 795 to provide power to the battery 750. That is, the input FET switch and control 710 couples each of the charging ICs 720 and 740 to the I/O port 790. Because of the desire to expedite the charging of the battery 750, the charging IC 720/740 is not disabled when the other charging IC 740/720 is used to charge the battery 750. Instead, both charging ICs 720 and 740 are configured for charging the battery 750 in this expedited battery charging mode and are not disabled or maintained in a standby mode.

In the expedited charging mode of operation, the charge to the battery 750 flows from the adapter 762 through the first transistor 705 of the switching device 780, through input FET switch and control 710, through the buck converter 720 and the buck converter 740, through the first inductor 775A and the second inductor 775B, through the system power 755, through the BatFET switch and control 765 to the battery 750. For example, a controller is operable to configure the first regulator 720 into a buck phase and also to configure the second regulator 740 into the buck phase to expedite the charging of the battery 750 by the adapter 762. Thus, power (current and/or voltage) from the adapter 762 is concurrently supplied to the battery 750 through both the charging ICs 720 and 740 and both of the first inductor 775A and the second inductor 775B according to the expedited battery charging mode of operation.

Figure 7D:
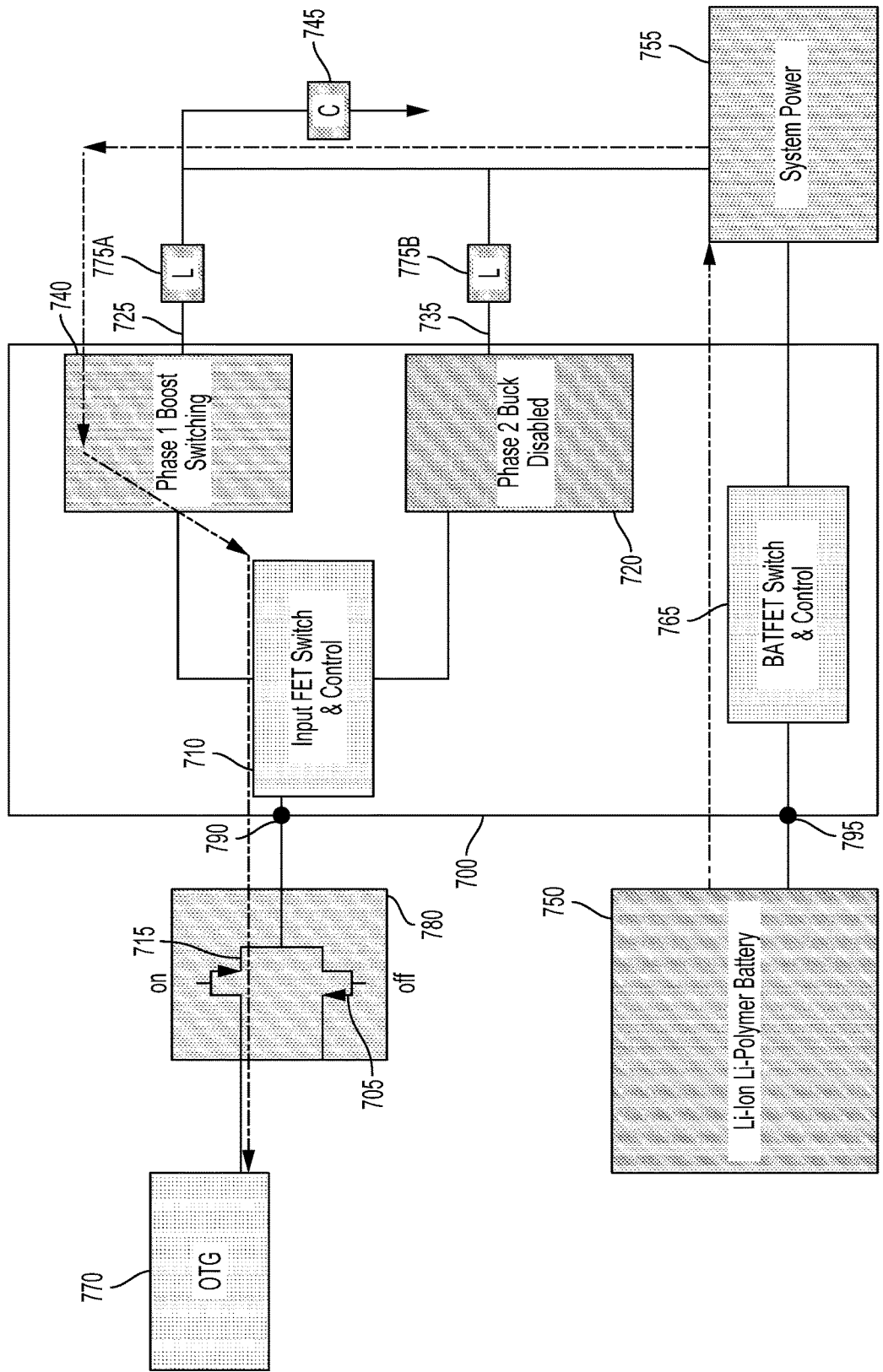
FIG. 7D shows a configuration of a power management component for powering a peripheral device through battery discharge according to aspects of the present disclosure.

FIG. 7D shows a configuration of a power management component for powering a peripheral device (e.g., stand-alone OTG device) through battery discharge according to aspects of the present disclosure. For illustrative purposes, some of the labelling and numbering of the devices and features of FIG. 7D are similar to those of the FIGS. 7A, 7B and 7C. The illustration of FIG. 7D, however, does not include the voltage regulation adjustment device 785. In this case, the power management component is operating in accordance with a standard battery discharging mode of operation where the battery 750 charges the peripheral device 770 (e.g., an on-the-go (OTG) peripheral device) or the peripheral device 770 is powered directly from the battery 750. It is noted that FIG. 7D also does not include the wireless adapter 760 or the adapter 762. The adapter 762 may be unavailable and only the battery 750 is available to power the peripheral device 770 in accordance with a standard OTG battery discharging mode. For example, in the standard OTG battery discharging mode, there is no low voltage regulation. Instead, the first regulator 740 operating in accordance with a boost mode is configured to supply a specified voltage (e.g., 5V), as opposed to a standby mode where the regulation is at a voltage, which is lower than the nominal voltage. Thus, the output of the boost in this case is regulated to 5V.

According to the standard OTG battery discharging mode (or single phase boost mode) of operation, the first regulator 740 of the power management component 700 is operated in accordance with a boost mode while the second regulator 720 is disabled. In operation, the peripheral device 770 may be powered by the battery 750. To support this mode of operation, the second phase (buck) of the power management component is disabled and the first phase (boost) of the power management component 700 is switched to boost mode to charge the peripheral device 770. For example, a controller is operable to activate a boost phase or mode to power the I/O port 790 in response to detecting a demand current of the peripheral device 770.

In this standard OTG battery discharging mode of operation, the charge from the battery 750 to the peripheral device 770 flows from the battery 750 through the BatFET switch and control 765, through the system power 755, through the first inductor 775A, through the boost converter 740, through input FET switch and control 710, through the second transistor 715 of the switching device 780 to the peripheral device 770. Thus, in one aspect of the disclosure, the input FET switch and control 710 and/or the switching device 780 are configured to couple the first regulator (e.g., the boost converter 740) to the I/O port 790 in the boost phase to power the peripheral device 770.

Figure 8:
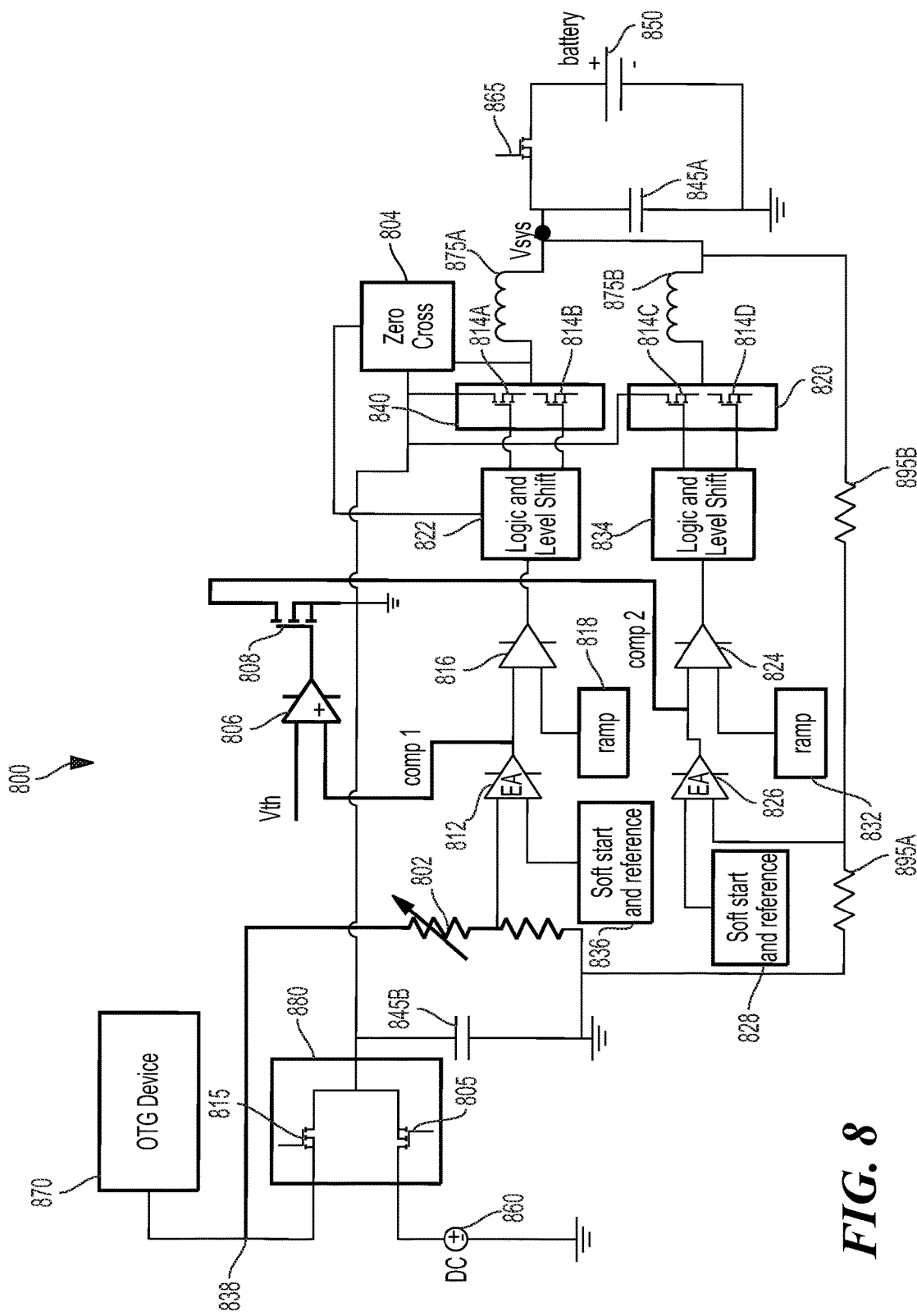
FIG. 8 shows a dual-phase concurrent configuration system including a power management component for concurrently charging and/or powering a peripheral device according to aspects of the present disclosure.

FIG. 8 shows a dual-phase concurrent configuration system 800 including a power management component for concurrently charging and/or powering a peripheral device, according to aspects of the present disclosure. The dual-phase concurrent configuration system 800 includes a peripheral device 870, a switching device 880, a capacitor 845A and a capacitor 845B, a battery 850, a BatFET switch and control 865, resistors 895A and 895B, and a voltage divider 802. The switching device 880 includes a first transistor 805 and a second transistor 815.

The dual-phase concurrent configuration system 800 also includes a first phase that corresponds to a boost converter 840 and supporting devices and a second phase that corresponds to a buck converter 820 and supporting devices. The boost converter 840 includes a high side FET 814A and a low side FET 814B. The buck converter 820 includes a high side FET 814C and a low side FET 814D. The supporting devices for the first phase include a zero cross detector 804, a first comparator 806, a third transistor 808, a first error amplifier 812, a second comparator 816, a first soft start and reference device 836, a first ramp device 818, a first logic level shift device 822 and a first inductor 875A. The supporting devices for the second phase include a third comparator 824, a second error amplifier 826, a second soft start and reference device 828, a second ramp device 832, a second logic level shift device 834 and a second inductor 875B.

In operation, the battery 850 receives charge from a wireless adapter 860 through the buck converter 820 and powers the peripheral device 870 through the boost converter 840. When the battery 850 is charging the peripheral device 870, the buck converter 820 is in buck standby mode. When the battery 850 is receiving a charge from the wireless adapter 860, the boost converter 840 is in boost standby mode.

In the boost standby mode, the boost is on but is not switching. In the boost standby mode, the output voltage of the peripheral device 870 is approximately equal to the output of the wireless adapter and is higher than a regulated voltage of the boost converter 840. To accomplish this, a boost reference voltage is set to regulate the boost converter 840 at a voltage that is slightly below the output voltage of the wireless adapter 860. For example, the boost converter 840 is regulated at 4.95V, which is slightly lower than the output voltage (e.g., 5V) of the wireless adapter 860.

Thus, the boost converter 840 does not enter boost mode because the voltage of the peripheral device 870 is higher than the regulated voltage of the boost converter 840. Rather, the boost converter 840 enters a tristate mode, which allows the boost converter to assume a high impedance state, or standby state, in addition to a boost mode and a disabled mode. In the tristate mode, the boost is prepared to regulate at a moment's notice because the boost soft start and other implementations for regulating are already completed. For example, power sequence biases are already completed. Switching the boost converter 840 to the tristate mode increases efficiency. The tristate mode allows transitioning from one phase charging the battery to another phase supplementing the current of the wireless charger quickly and seamlessly.

When the peripheral device 870 starts drawing more current (e.g., from 10 mA to 2 A), the output voltage of the peripheral device 870 drops accordingly. In some instances, the drop in voltage may be slowed down by a capacitor (e.g., capacitor 845B) at the output of the peripheral device 870. For example, the output voltage may drop from 5V to 4.8V or 4.5V. The boost converter 840, which is regulating at a higher voltage (4.95V) than the output voltage can now enter into boost mode. Thus, the boost converter 840 switches from standby mode as illustrated in FIG. 7A to boost or switching mode, as illustrated in FIG. 7B. In the meantime, the buck converter 820 is disabled or enters standby mode as a consequence of the switch of the boost converter 840 to boost mode.

A zero cross detector 804 across a high side FET 814A prevents current from reversing when the boost converter 840 is in the standby mode. In normal operation of the boost converter 840, the current flows from the battery 850, through the first inductor 875A, through the boost converter 840 to the peripheral device 870. When the current starts flowing in the reverse direction, the boost converter 840 enters standby mode. For example, the zero cross detector 804 turns off a switch (e.g., high side FET 814A) in the boost converter 840 to prevent current from flowing in or out of the boost converter 840. A zero cross detector (not shown) may also be applied to the buck converter 820. Standby mode or the boost can also be achieved by changing the resistor feedback ratio in the voltage divider 802 so that the boost converter regulation set point is lower than that of the wireless adapter 860.

As noted, a boost reference voltage (or feedback) is set to regulate the boost converter 840 at a voltage that is slightly below the output voltage of the wireless adapter 860. The feedback voltage for the boost may be determined at an output of the peripheral device or an input to the first phase. For example, the feedback to the boost may be identified at node 838. The feedback voltage at node 838 may be divided using a voltage divider 802 and the result compared to a reference voltage value generated by from the first soft start and reference device 836. A first error amplifier 812 compares the two voltages and sends the result of the feedback comparison to an input of the second comparator 816. The output (result of feedback voltage comparison) of the first error amplifier 812 is also coupled to an input of the first comparator 806.

In this arrangement, the ramp device 818 is proportional to the inductor current in the boost (current mode control). At heavy load, the ramp voltage increases; at light load it will decrease as it tracks the inductor current. An offset is also added to the ramp along with slope compensation. Thus, the error amplifier 812 output, comp1, is proportional to the boost inductor current. It is near ground when the boost is delivering little current and it is near the supply voltage when the boost is under heavy load. Those skilled in the art will recognize that this is one of many ways of determining the boost inductor current.

In one aspect, if the resulting value after dividing the feedback voltage at the voltage divider 802 is higher than the reference voltage value from the first soft start and reference device 836, the compensation value, which is the output of the first error amplifier 812 is zero. For example, the compensation value may be proportional to the current or charge delivered by the boost converter 840 to a load (e.g., the peripheral device 870). Thus, when the current delivered by the boost converter 840 is high, the compensation value is at a high voltage. When delivering no current, the compensation value is at a low voltage.

If the output of the comparator 816 is high, the logic level shift device 822 will not turn on the low side FET 814B in the boost converter 840. In standby mode, the output of the error amplifier 812 will be below the ramp device 818, and the comparator 816 is high. Thus, the boost converter 840 will not switch.

As noted, when the dual-phase concurrent configuration system 800 is in a state where the output voltage (e.g., 5V) of the peripheral device 870 is higher than the regulation voltage (e.g., 4.95V) of the boost converter 840, compensation value (comp 1) is zero or close to zero. A threshold voltage value (Vth) is set at the input of the first comparator 806. For example, Vth is set to between 100 mV to 300 mV, which may be programmable. The first comparator 806 compares the compensation value to the threshold value and sends an indication (e.g., voltage indication) to keep the buck converter 820 in buck mode because the boost converter 840 is not switching. The indication to keep the buck converter 820 in the buck mode is associated with an output of the first comparator 806 and is sent to the buck converter 820.

The indication to keep the buck converter 820 in the buck mode is sent to the buck converter 820 based on the output of the first comparator 806 which is sent to an input (comp 2) of the third comparator 824 via the third transistor 808. In one aspect of the disclosure, sending the output of the first comparator 806 to the input of the third comparator 824 causes the output of the second error amplifier 826 to be pulled down. A second ramp voltage of the second ramp device 832 is compared to the output of the first comparator 806, and the result is sent to the second logic level shift device 834. The second logic level shift device 834 generates the indication to keep the buck converter 820 in the buck mode. When the boost converter 840 is delivering a significant amount of current, however, the buck converter 820 is switched to standby mode or disabled. Pulling down comp 2 to ground by the third transistor 808 is a convenient way to place the buck in standby. To accomplish this feature, the second ramp device 832 includes a direct current (DC) offset, which allows the comp 2 to swing below the second ramp voltage.

Figure 9:
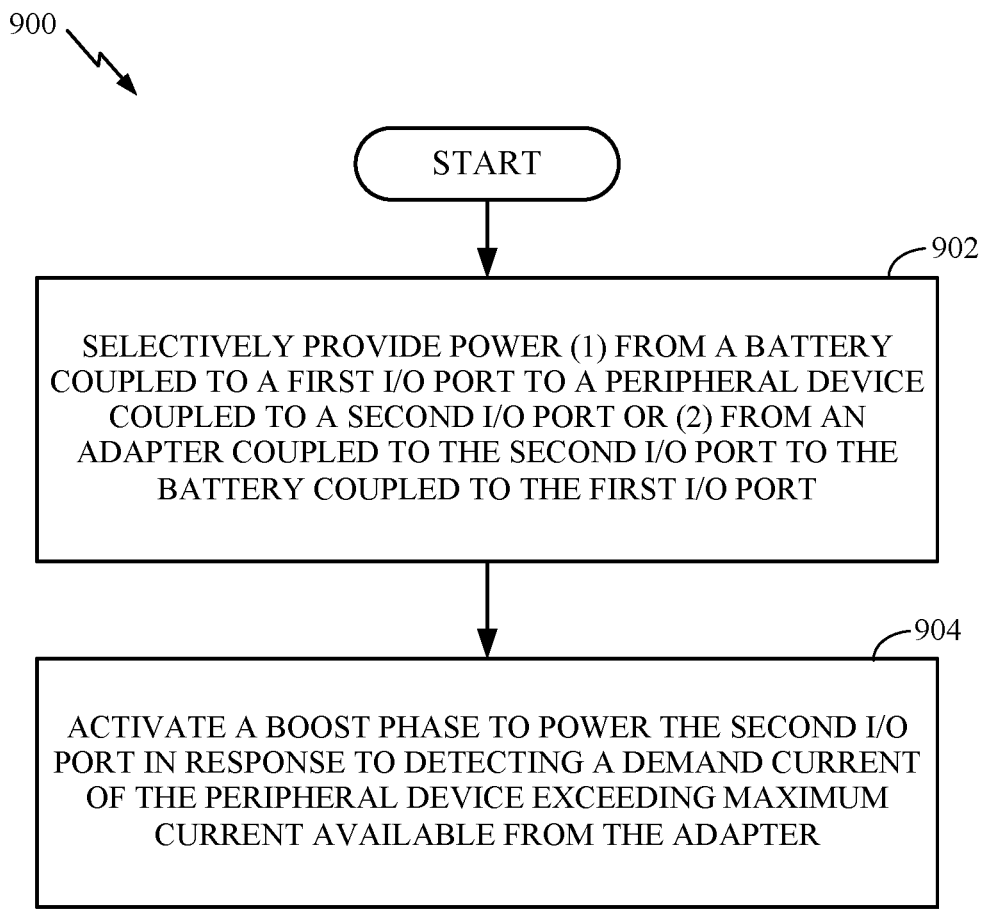
FIG. 9 is a process flow diagram illustrating a method of concurrently charging a battery and powering a peripheral device according to an aspect of the present disclosure.

FIG. 9 is a process flow diagram 900 illustrating a method of operating a multiphase switch mode regulator (e.g., dual-phase switch mode regulator) for concurrent operation according to an aspect of the present disclosure. In block 902, power is selectively provided (i) from a battery coupled to a first input/output (I/O) port to a peripheral device coupled to a second I/O port or (ii) from an adapter coupled to the second I/O port to the battery coupled to the first I/O port. In block 904, a boost phase is activated to power the second I/O port in response to detecting a demand current of the peripheral device exceeding a maximum current available from the adapter.

According to a further aspect of the present disclosure, a battery charging circuit including a dual-phase integrated circuit (IC) is described. The dual-phase IC includes a dual-phase voltage regulator operable to selectively provide power (i) from the first I/O port to the second I/O port to provide power to the peripheral device or (ii) from the second I/O port to the first I/O port to provide power to the battery. The dual-phase switch mode regulator further includes means for activating a boost phase to power the second I/O port in response to detecting a demand current of the peripheral device exceeding a maximum current available from the adapter. The boost phase activating means may include the buck controller 510, the boost controller 530, and/or the controller 610/615. The aforementioned means may be any module or any apparatus configured to perform the functions recited by the aforementioned means.

Figure 10:
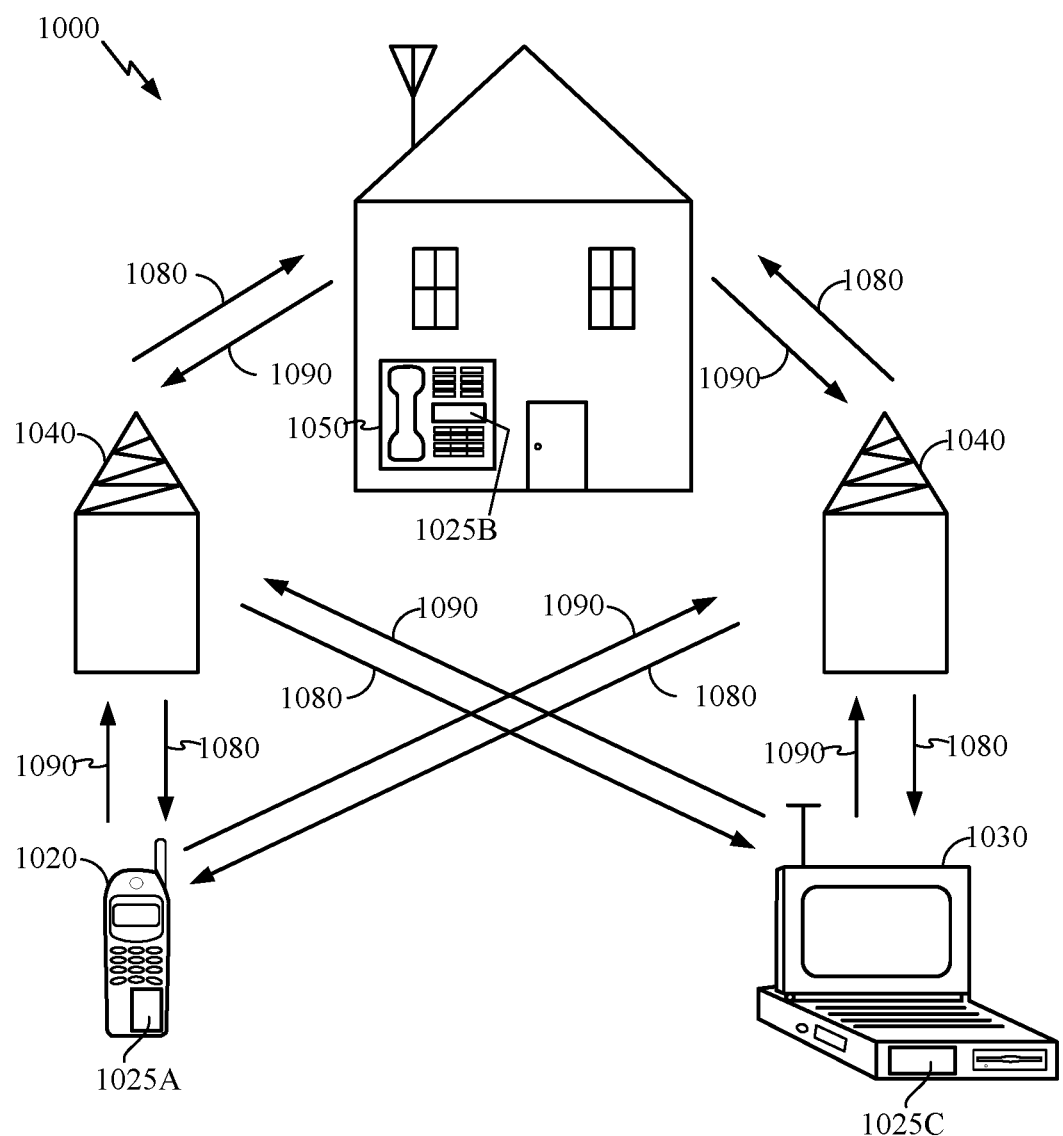
FIG. 10 is a block diagram showing an exemplary wireless communication system in which a configuration of the disclosure may be advantageously employed.

FIG. 10 is a block diagram showing an exemplary wireless communication system 1000 in which an aspect of the disclosure may be advantageously employed. For purposes of illustration, FIG. 10 shows three remote units 1020, 1030, and 1050 and two base stations 1040. It will be recognized that wireless communication systems may have many more remote units and base stations. Remote units 1020, 1030, and 1050 include IC devices 1025A, 1025C, and 1025B that may include the disclosed dual-phase switch mode regulators. It will be recognized that other devices may also include the disclosed dual-phase switch mode regulators, such as the base stations, switching devices, and network equipment. FIG. 10 shows forward link signals 1080 from the base station 1040 to the remote units 1020, 1030, and 1050 and reverse link signals 1090 from the remote units 1020, 1030, and 1050 to base stations 1040.

In FIG. 10, remote unit 1020 is shown as a mobile telephone, remote unit 1030 is shown as a portable computer, and remote unit 1050 is shown as a fixed location remote unit in a wireless local loop system. For example, a remote unit may be a mobile phone, a hand-held personal communication systems (PCS) unit, a portable data unit such as a personal data assistants, a GPS enabled device, a navigation device, a set top box, a music player, a video player, an entertainment unit, a fixed location data unit such as a meter reading equipment, or other devices that store or retrieve data or computer instructions, or combinations thereof. Although FIG. 10 illustrates remote units according to the aspects of the disclosure, the disclosure is not limited to these exemplary illustrated units. Aspects of the disclosure may be suitably employed in many devices, which include the disclosed dual-phase switch mode regulators.

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general-purpose or special-purpose computer. By way of example, and not limitation, such computer-readable media can include RAM, ROM, EEPROM, CD-ROM or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD) and Blu-ray disc where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "a step for."

What is claimed is:

1. A battery charging circuit, comprising:
   a dual-phase integrated circuit having a first port coupled to a battery, a second port coupled to an external power source, and a third port coupled to a peripheral device, the dual-phase integrated circuit, comprising:
      a dual-phase voltage regulator operable to selectively provide power (i) from the first port to the third port to provide power to the peripheral device or (ii) from the second port to the first port to provide power to the battery; and
      a controller operable to activate a boost phase to power the third port in response to detecting a demand current of the peripheral device exceeding a maximum current available from the external power source.

2. The battery charging circuit of claim 1, in which the controller is further operable to terminate a buck phase of a battery charging operation when the demand current from the peripheral device exceeds the maximum current available from the external power source.

3. The battery charging circuit of claim 1, in which the dual-phase voltage regulator comprises:
   a first regulator operable (i) in accordance with a buck phase or the boost phase during an active state and (ii) in a tristate during an inactive phase; and
   a second regulator operable (i) in accordance with the boost phase or the buck phase during the active state and (ii) in the tristate during the inactive phase.

4. The battery charging circuit of claim 3, in which the controller is further operable to transition the first regulator from the boost phase into the tristate and to transition the second regulator to the buck phase when the demand current from the peripheral device is less than the maximum current available from the external power source.

5. The battery charging circuit of claim 3, in which the dual-phase voltage regulator further comprises:
   a switch coupled to the second port, the third port, the first regulator, and the second regulator to selectively couple the first regulator and the second regulator to at least one of the second port and the third port.

6. The battery charging circuit of claim 5, in which the switch is configured to selectively couple (i) the first regulator to the third port in the boost phase to power the peripheral device or (ii) the second regulator to the second port in the buck phase to charge the battery.

7. The battery charging circuit of claim 5, in which the switch couples the second port to the first regulator and to the second regulator when both regulators operate in the buck phase to charge the battery.

8. The battery charging circuit of claim 3, in which the controller is operable to transition the second regulator from the active state to the tristate to terminate the buck phase of a battery charging operation, and to transition the first regulator from the tristate to the active state to power the third port using the boost phase.

9. The battery charging circuit of claim 1, in which current from the external power is concurrently supplied to the peripheral device and the battery according to a buck phase of a battery charging operation when the peripheral device draws an amount of current less than an amount of current provided by the external power source.

10. The battery charging circuit of claim 1, in which the external power source comprises a wireless adapter.

11. The battery charging circuit of claim 1, in which the peripheral device comprises an on-the-go (OTG) device.

12. The battery charging circuit of claim 1, integrated into a mobile phone, a set top box, a music player, a video player, an entertainment unit, a navigation device, a computer, a hand-held personal communication systems (PCS) unit, a portable data unit, and/or a fixed location data unit.

13. A method of operating a multiphase switch mode regulator, comprising:
selectively providing power (i) from a battery coupled to a first port to a peripheral device coupled to a second port or (ii) from an external power source coupled to a third port to the battery coupled to the first port; and
activating a boost phase to power the second port in response to detecting a demand current of the peripheral device exceeding a maximum current available from the external power source.

14. The method of claim 13, further comprising:
detecting attachment of the peripheral device to the second port when the power is provided from the external power source to the battery in accordance with a charging operation;
terminating a buck phase of the charging operation when the demand current from the peripheral device exceeds the maximum current available from the external power source; and
powering the second port in response to detecting attachment of the peripheral device to the second port using the boost phase.

15. The method of claim 14, further comprising:
concurrently charging the battery using the buck phase while supplying current to the second port using the external power source when the demand current from the peripheral device is less than the maximum current available from the external power source.

16. The method of claim 14, further comprising:
transitioning the buck phase from an active state to a tristate; and
concurrently transitioning the boost phase from the tristate to the active state to power the peripheral device in response to detecting the demand current from the peripheral device exceeds the maximum current available from the external power source.

17. The method of claim 16, further comprising:
transitioning the boost phase from the tristate to the active state; and
concurrently transitioning the buck phase from the tristate to the active state to charge the battery in response to detecting the demand current from the peripheral device is less than the maximum current available from the external power source.

18. The method of claim 13, further comprising integrating the multiphase switch mode regulator into a mobile phone, a set top box, a music player, a video player, an entertainment unit, a navigation device, a computer, a hand-held personal communication systems (PCS) unit, a portable data unit, and/or a fixed location data unit.

19. A battery charging circuit, comprising:
a dual-phase integrated circuit having a first port coupled to a battery, a second port coupled to an external power source, and a third port coupled to a peripheral device, the dual-phase integrated circuit, comprising:
a dual-phase voltage regulator operable to selectively provide power (i) from the first port to the third port to provide power to the peripheral device or (ii) from the second port to the first port to provide power to the battery; and
means for activating a boost phase to power the third port in response to detecting a demand current of the peripheral device exceeding a maximum current available from the external power source.

20. The battery charging circuit of claim 19, further comprising means for terminating a buck phase of a battery charging operation when the demand current from the peripheral device exceeds the maximum current available from the external power source.

21. The battery charging circuit of claim 19, in which the dual-phase voltage regulator comprises:
a first regulator operable (i) in accordance with a buck phase or the boost phase during an active state and (ii) in a tristate during an inactive phase; and
a second regulator operable (i) in accordance with the boost phase or the buck phase during the active state and (ii) in the tristate during the inactive phase.

22. The battery charging circuit of claim 19, integrated into a mobile phone, a set top box, a music player, a video player, an entertainment unit, a navigation device, a computer, a hand-held personal communication systems (PCS) unit, a portable data unit, and/or a fixed location data unit.

* * * * *